(12) United States Patent
Ye et al.

(10) Patent No.: US 11,650,399 B2
(45) Date of Patent: May 16, 2023

(54) OPTICAL IMAGING LENS ASSEMBLY

(71) Applicant: Zhejiang Sunny Optical Co., Ltd., Ningbo (CN)

(72) Inventors: Lihui Ye, Ningbo (CN); Ming Li, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 359 days.

(21) Appl. No.: 16/844,719

(22) Filed: Apr. 9, 2020

(65) Prior Publication Data

US 2020/0233187 A1 Jul. 23, 2020

Related U.S. Application Data

(63) Continuation of application No. PCT/CN2018/117169, filed on Nov. 23, 2018.

(30) Foreign Application Priority Data

Dec. 12, 2017 (CN) .......................... 201711318333.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC .................................................. 359/708, 755
See application file for complete search history.

(56) References Cited

U.S. PATENT DOCUMENTS

| 9,798,112 B2 | 10/2017 | Huang | |
|---|---|---|---|
| 2015/0103414 A1* | 4/2015 | Baik | G02B 13/18 |
| | | | 359/755 |
| 2016/0259152 A1* | 9/2016 | Huang | G02B 9/64 |

FOREIGN PATENT DOCUMENTS

| CN | 106547072 A | 3/2017 |
|---|---|---|
| CN | 107367827 A | 11/2017 |
| CN | 107436481 A | 12/2017 |
| CN | 108051898 A | 5/2018 |
| CN | 207799215 U | 8/2018 |
| JP | 2017097197 A | 6/2017 |

OTHER PUBLICATIONS

Intellectual Property India, Application No. 202047017289, First Examination Report, dated May 29, 2021, 6 pages.

* cited by examiner

*Primary Examiner* — James R Greece
(74) *Attorney, Agent, or Firm* — Barnes & Thornburg LLP

(57) ABSTRACT

The application discloses an optical imaging lens assembly including, sequentially from an object side to an image side, a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein an effective focal length f of the optical imaging lens assembly, an entrance pupil diameter EPD of the optical imaging lens assembly and a space interval T67 between the sixth lens and the seventh lens satisfy f/EPD≤1.80, and 5.5<f/T67<11.5.

19 Claims, 9 Drawing Sheets

OPTICAL IMAGING LENS ASSEMBLY

CROSS-REFERENCE TO RELATED APPLICATIONS

The present patent application is a continuation of International Application No. PCT/CN2018/117169, filed on Nov. 23, 2018, which claims priority from Chinese Patent Application No. 201711318333.9, filed on Dec. 12, 2017 before the China National Intellectual Property Office (CNIPA). Both of the aforementioned patent applications are hereby incorporated by reference in their entireties.

TECHNICAL FIELD

The invention relates to an optical imaging lens assembly, and in particular to an optical imaging lens assembly consisting of seven lenses.

BACKGROUND

As the consumer electronic products, such as mobile phones and tablet computers, are being rapidly updated, it is required for the imaging cameras to be more and more diverse in the market. At present, the development of the electronic products shows interest in good function with a light weight and a thin appearance, which requires an imaging lens assembly installed therein to be shaped with short and thin appearances such that it is suitable for installation and to have good imaging quality.

Therefore, the present disclosure proposes an optical imaging lens assembly suitable for portable electronic products and with large aperture and excellent imaging quality.

SUMMARY

To solve at least one of the problems in the prior art, the disclosure provides an optical imaging lens assembly.

One aspect of the disclosure provides an optical imaging lens assembly including, sequentially from an object side to an image side of the optical imaging lens assembly, a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein an effective focal length f of the optical imaging lens assembly and an entrance pupil diameter EPD of the optical imaging lens assembly satisfy $f/EPD \leq 1.80$, and the effective focal length f of the optical imaging lens assembly and a space interval T67 between the sixth lens and the seventh lens satisfy $5.5 < f/T67 < 11.5$.

According to an embodiment of the disclosure, the effective focal length f of the optical imaging lens assembly and an effective focal length f5 of the fifth lens satisfy $0.5 < f5/f < 1.5$.

According to an embodiment of the disclosure, a distance TTL along an optical axis from an object side surface of the first lens to an imaging surface and half of a diagonal length ImgH of an effective pixel region on the imaging surface satisfy $TTL/ImgH \leq 1.70$.

According to an embodiment of the disclosure, an effective focal length f5 of the fifth lens and an effective focal length f7 of the seventh lens satisfy $-2 < f5/f7 < -1$.

According to an embodiment of the disclosure, an effective focal length f1 of the first lens and a central thickness CT1 of the first lens satisfy $4.5 < f1/CT1 < 6.5$.

According to an embodiment of the disclosure, a combined focal length f56 of the fifth lens and the sixth lens and a central thickness CT2 of the second lens satisfy $13.0 < f56/CT2 < 21.0$.

According to an embodiment of the disclosure, a curvature radius R6 of the image side surface of the third lens and a curvature radius R7 of the object side surface of the fourth lens satisfy $1.5 < R6/R7 < 3.5$.

According to an embodiment of the disclosure, a curvature radius R3 of the object side surface of the second lens and a curvature radius R10 of the image side surface of the fifth lens satisfy $-5.0 < R3/R10 < -2.0$.

According to an embodiment of the disclosure, a central thickness CT3 of the third lens and a central thickness CT4 of the fourth lens satisfy $0.5 < CT3/CT4 < 1.0$.

According to an embodiment of the disclosure, a space interval T23 between the second lens and the third lens and a space interval T34 between the third lens and the fourth lens satisfy $T34/T23 < 1.0$.

According to an embodiment of the disclosure, a combined focal length f12 of the first lens and the second lens and a combined focal length f56 of the fifth lens and the sixth lens satisfy $1.0 < f12/f56 < 2.0$.

According to an embodiment of the disclosure, a combined focal length f12 of the first lens and the second lens and a central thickness CT4 of the fourth lens satisfy $9.0 < f12/CT4 < 16.0$.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a combined focal length f12 of the first lens and the second lens and a central thickness CT4 of the fourth lens satisfy $9.0 < f12/CT4 < 16.0$.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a distance TTL along an optical axis from an object side surface of the first lens to an imaging surface and a half diagonal length ImgH of an effective pixel region on the imaging surface satisfy $TTL/ImgH \leq 1.70$.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein an effective focal length f of the optical imaging lens assembly and an effective focal length f5 of the fifth lens satisfy 0.5<f5/f<1.5.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein an effective focal length f5 of the fifth lens and an effective focal length f7 of the seventh lens satisfy −2<f5/f7<−1.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein the effective focal length f1 of the first lens and the central thickness CT1 of the first lens satisfy 4.5<f1/CT1<6.5.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a combined focal length f56 of the fifth lens and the sixth lens and a central thickness CT2 of the second lens satisfy 13.0<f56/CT2<21.0.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a curvature radius R6 of the image side surface of the third lens and a curvature radius R7 of the object side surface of the fourth lens satisfy 1.5<R6/R7<3.5.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a curvature radius R3 of the object side surface of the second lens and a curvature radius R10 of the image side surface of the fifth lens satisfy −5.0<R3/R10<−2.0.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a central thickness CT3 of the third lens and a central thickness CT4 of the fourth lens satisfy 0.5<CT3/CT4<1.0.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a space interval T23 between the second lens and the third lens and a space interval T34 between the third lens and the fourth lens satisfy T34/T23<1.0.

One aspect of the disclosure provides an optical imaging lens assembly, sequentially from an object side to an image side of the optical imaging lens assembly, including a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power, wherein a combined focal length f12 of the first lens and the second lens and a combined focal length f56 of the fifth lens and the sixth lens satisfy 1.0<f12/f56<2.0.

The optical imaging lens assembly according to the disclosure is applicable for portable electronic products, and is an optical imaging lens assembly with a large aperture and good imaging quality.

BRIEF DESCRIPTION OF THE DRAWINGS

Other features, purpose and advantages of the disclosure will become more apparent from the following detailed description of non-limiting embodiments in conjunction with the accompanying drawings, in which.

DETAILED DESCRIPTION OF EMBODIMENTS

Figure 1:
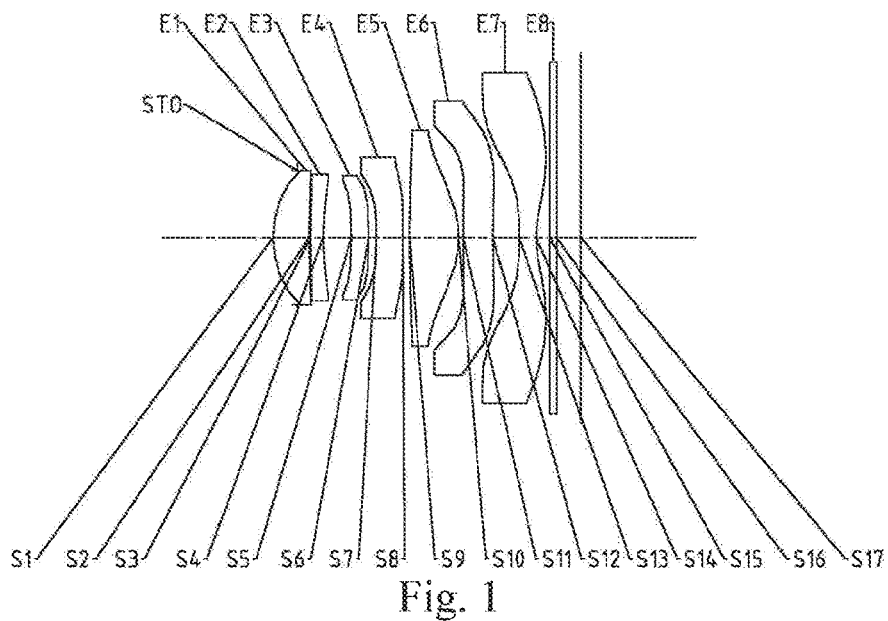
FIG. 1 shows a schematic structural diagram of an optical imaging lens assembly of Example 1.

Further details of the disclosure are described below with reference to the accompanying drawings and embodiments. It is understood that the specific embodiments described herein are used merely for explaining the related invention and should not be interpreted to be any limit to the invention. It should also be noted that, for ease of description, only the relevant parts of the disclosure are shown in the drawings.

It should be understood that in the disclosure, when an element or layer is described as being "on," "connected to," or "coupled to" another element or layer, it may be disposed directly on the another element or layer, directly connected or coupled to the another element or layer, or there may present an intermediate element or layer therebetween. When an element is referred to as being "directly on" another element or layer, "directly connected to" or "directly coupled to" another element or layer, there is no intermediate element or layer. Throughout the specification, the same reference numerals refer to the same elements. As used herein, the expression "and/or" includes any one of or any combination of the listed items.

It should be understood that while the terms 1st, 2nd or first, second, etc., may be used therein to modify various elements, components, regions, layers and/or segments, these elements, components, regions, layers and/or segments should not be limited by these terms. These terms are used merely for distinguishing one component, component, region, layer or segment from another component, component, region, layer or segment. Therefore, without departing from the teachings of the disclosure, a first element, component, region, layer or segment discussed below may be referred to as a second element, component, region, layer or segment.

The terms used herein are used merely for the purpose of describing specific embodiments and are not intended to limit the disclosure. As used herein, features that do not be specifically limited as a singular or plural form does not exclude the plural form unless explicitly indicated in the context. It should also be understood that the terms "include," "including," "having," "comprise" and/or "comprising" when used in this specification indicate the presence of stated features, integrals, steps, operations, elements and/or components, but do not exclude the presence or addition of one or more other features, integrals, steps, operations, elements, components and/or combinations thereof. As used herein, the expression "and/or" includes any one of or any combination of the listed items. The expressions such as "at least one of . . . " preceding a list of features modify the entire list of features rather than an individual element in the list. Further, the use of "may," when describing implementations of the disclosure, refers to "one or more implementations of the disclosure." Also, the term "exemplary" is intended to refer to an example or illustration.

Unless otherwise defined, all terms (including technical and scientific terms) used herein have the same meaning as commonly understood by those of ordinary skill in the art to which the disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly defined as that herein.

It should be noted that the embodiments of the disclosure and the features of the embodiments may be combined without conflict. The disclosure will be described in detail below with reference to the accompanying drawings and in conjunction with the embodiments.

The disclosure provides an optical imaging lens assembly including, sequentially from an object side to an image side, a first lens with a positive refractive power and a concave image side surface; a second lens with a negative refractive power and a convex object side surface; a third lens with a refractive power and a convex image side surface; a fourth lens with a negative refractive power and a concave object side surface; a fifth lens with a positive refractive power and a convex image side surface; a sixth lens with a refractive power; and a seventh lens with a negative refractive power.

In the embodiment of the disclosure, an effective focal length f of the optical imaging lens assembly and an entrance pupil diameter EPD of the optical imaging lens assembly satisfy f/EPD≤1.80, and the effective focal length f of the optical imaging lens assembly and a space interval T67 between the sixth lens and the seventh lens satisfy 5.5<f/T67<11.5, specifically, 6.65≤f/T67≤11.30. The low-order aberrations of the system can be effectively balanced by the distribution of the positive and negative refractive power of each of the lenses of the system, the sensitivity of the tolerance can be reduced, and the miniaturization of the system can be maintained. By satisfying the above-mentioned relation, the optical lens group can be made to have the advantage of a large aperture, so that the imaging effect in the dark environment can be enhanced while the aberration of the edge field of view is reduced, thereby effectively limiting the distortion of the system.

In the embodiment of the disclosure, the effective focal length f of the optical imaging lens assembly and an effective focal length f5 of the fifth lens satisfy 0.5<f5/f<1.5, specifically, 0.71≤f5/f≤1.11. By satisfying the above relation, the refractive power of the fifth lens can be controlled so that the tolerance sensitivity can be reduced, and the miniaturization of the imaging system can be maintained.

In the embodiment of the disclosure, a distance TTL along an optical axis from an object side surface of the first lens to an imaging surface and half of a diagonal length ImgH of an effective pixel region on the imaging surface satisfy TTL/ImgH≤1.70, specifically, TTL/ImgH≤1.69. By satisfying the above-mentioned relation, the total length of the lens assembly and the image height can be controlled, and the total size of the imaging lens assembly can be effectively compressed to realize the ultra-thin characteristic and miniaturization of the imaging lens assembly.

In the embodiment of the disclosure, an effective focal length f5 of the fifth lens and an effective focal length f7 of the seventh lens satisfy −2<f5/f7<−1, specifically, −1.785≤f5/f7≤−1.02. By satisfying the above-mentioned relation, the refractive powers of the fifth lens and the seventh lens can be controlled, and the distortion at the imaging plane near the optical axis can be corrected effectively, thus improving the imaging quality of the system.

In the embodiment of the disclosure, an effective focal length f1 of the first lens and a central thickness CT1 of the first lens satisfy 4.5<f1/CT1<6.5, and specifically satisfy 4.69≤f1/CT1≤6.36. If the central thickness of the lens is too thick or too thin, it will cause difficulty to shape the lens. Satisfying the above conditional expression can appropriately balance the focal length and thickness of the first lens, and can effectively correct system aberrations and facilitate processing.

In the embodiment of the disclosure, a combined focal length f56 of the fifth lens and the sixth lens and a central thickness CT2 of the second lens satisfy 13.0<f56/CT2<21.0, specifically, 13.08≤f56/CT2≤20.55. By satisfying the above-mentioned relation, the focal lengths of the fifth lens and the sixth lens and the central thickness of the second lens can be controlled, the chromatic aberration of the system can be corrected, and the distortion and the meridianal coma can be controlled.

In the embodiment of the disclosure, a curvature radius R6 of the image side surface of the third lens and a curvature radius R7 of the object side surface of the fourth lens satisfy 1.5<R6/R7<3.5, specifically, 1.79≤R6/R7≤3.09. By satisfying the above relation, the spherical aberration and the astigmatism may be reduced.

In the embodiment of the disclosure, a curvature radius R3 of the object side surface of the second lens and a curvature radius R10 of the image side surface of the fifth lens satisfy −5.0<R3/R10<−2.0, specifically, −4.42≤R3/R10≤−2.31. By the cooperation of the second lens and the fifth lens, the chromatic aberration of the system can be corrected and various aberrations can be compensate.

In the embodiment of the disclosure, a central thickness CT3 of the third lens and a central thickness CT4 of the fourth lens satisfy 0.5<CT3/CT4<1.0, and specifically satisfy 0.58≤CT3/CT4≤0.92. By satisfying the above relation, the lens size distribution is even, the assembly stability is guaranteed, the aberration of the whole imaging system is reduced, and the total length of the imaging system is shortened.

In the embodiment of the disclosure, a space interval T23 between the second lens and the third lens and a space interval T34 between the third lens and the fourth lens satisfy T34/T23<1.0, specifically T34/T23≤0.62. By controlling the space interval between the second lens and the third lens and the space interval between the third lens and the fourth lens, it is possible to ensure that there is a sufficient distance between the second lens and the third lens on the optical axis, and to avoid problems in lens assembly process and molding in the case where the second lens and the third lens are too close to each other.

In the embodiment of the disclosure, a combined focal length f12 of the first lens and the second lens and a combined focal length f56 of the fifth lens and the sixth lens satisfy 1.0<f12/f56<2.0, specifically, 1.09≤f12/f56≤1.66. By satisfying the above-mentioned relation, the refractive powers of the first lens, the second lens, the fifth lens and the sixth lens can be properly assigned, the total refractive power of the entire optical system can be controlled, and the optical system can have a better flat field curvature capability.

In the embodiment of the disclosure, a combined focal length f12 of the first lens and the second lens and a central thickness CT4 of the fourth lens satisfy 9.0<f12/CT4<16.0, and specifically satisfy 9.72≤f12/CT4≤15.90. By satisfying the above relation, the refractive powers of the first lens and the second lens and the central thickness of the fourth lens can be appropriately assigned to control the overall refractive power of the entire optical system.

The disclosure is further described below with reference to specific examples.

Example 1

First, an optical imaging lens assembly according to Example 1 of the disclosure is described with reference to FIGS. 1 to 5.

FIG. 1 is a schematic structural diagram illustrating the optical imaging lens assembly of Example 1. As shown in FIG. 1, the optical imaging lens assembly includes seven lenses. The seven lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, a sixth lens E6 having an object side surface S11 and an image side surface S12, and a seventh lens E7 having an object side surface S13 and an image side surface S14, respectively. The first lens E1 to the seventh lens E7 are sequentially disposed from an object side to an image side of the optical imaging lens assembly.

The first lens E1 may have a positive refractive power. The object side surface S1 of the first lens E1 may be convex, and the image side surface S2 of the first lens E1 is concave.

The second lens E2 may have a negative refractive power. The object side surface S3 of the second lens E2 may be convex, and the image side surface S4 of the second lens E2 may be concave.

The third lens E3 may have a negative refractive power. The object side surface S5 of the third lens E3 may be concave, and the image side surface S6 of the third lens E3 may be convex.

The fourth lens E4 may have a negative refractive power. The object side surface S7 of the fourth lens E4 may be concave, and the image side surface S8 of the fourth lens E4 may be concave.

The fifth lens E5 may have a positive refractive power. The object side surface S9 of the fifth lens E5 may be convex, and the image side surface S10 of the fifth lens E5 may be convex.

The sixth lens E6 may have a negative refractive power. The object side surface S11 of the sixth lens E6 may be convex, and the image side surface S12 of the sixth lens E6 may be concave.

The seventh lens E7 may have a negative refractive power. The object side surface S13 of the seventh lens E7 may be concave, and the image side surface S14 of the seventh lens E7 may be concave.

The imaging camera further includes a filter E8 having an object side surface S15 and an image side surface S16 for filtering infrared light. In this example, the light from the object passes through the surfaces S1 to S16 in sequence and is finally imaged on the imaging surface S17.

In this example, the first lens E1 to the seventh lens E7 have effective focal lengths f1 to f7, respectively. The first lens E1 to the seventh lens E7 are sequentially arranged along the optical axis and collectively determine a total effective focal length f of the optical imaging lens assembly. Table 1 below shows the effective focal lengths f1 to f7 of the first lens E1 to the seventh lens E7, the total effective focal length f of the optical imaging lens assembly, a total length TTL (mm) of the optical imaging lens assembly, and half of a diagonal length ImgH of the effective pixel region on the electronic photosensitive element.

TABLE 1

| f1 (mm) | 3.79 | f (mm) | 3.83 |
|---|---|---|---|
| f2 (mm) | −26.50 | TTL (mm) | 5.08 |
| f3 (mm) | −31.98 | ImgH (mm) | 3.04 |
| f4 (mm) | −8.88 | | |
| f5 (mm) | 2.71 | | |
| f6 (mm) | −86.43 | | |
| f7 (mm) | −2.66 | | |

Table 2 shows the surface type, curvature radius, thickness, material, and conical coefficient of each of the lenses in the optical imaging lens assembly of this example, wherein both the curvature radius and the thickness are expressed in millimeters (mm).

TABLE 2

| Surface No. | Surface Type | Curvature Radius | Thickness | Refractive Index | Abbe number | Conic Coefficient |
|---|---|---|---|---|---|---|
| OBJ | Spherical | Infinite | Infinite | | | |
| STO | Spherical | Infinite | −0.3997 | | | |
| S1 | Aspherical | 1.7138 | 0.5957 | 1.55 | 56.1 | 0.2132 |
| S2 | Aspherical | 8.7975 | 0.0250 | | | −99.0000 |
| S3 | Aspherical | 7.0050 | 0.2100 | 1.65 | 23.5 | 6.2382 |
| S4 | Aspherical | 4.9072 | 0.4683 | | | 6.7561 |
| S5 | Aspherical | −11.0000 | 0.2803 | 1.55 | 56.1 | 79.4281 |
| S6 | Aspherical | −30.0000 | 0.1295 | | | 99.0000 |
| S7 | Aspherical | −9.7013 | 0.4367 | 1.65 | 23.5 | 38.1189 |
| S8 | Aspherical | 14.1579 | 0.1155 | | | −37.0595 |
| S9 | Aspherical | 17.8944 | 0.8093 | 1.55 | 56.1 | 98.5699 |
| S10 | Aspherical | −1.5857 | 0.0746 | | | −2.1655 |
| S11 | Aspherical | 66.0461 | 0.4872 | 1.65 | 23.5 | −99.0000 |
| S12 | Aspherical | 30.1054 | 0.4263 | | | −44.8287 |
| S13 | Aspherical | −21.4143 | 0.2800 | 1.55 | 56.1 | 24.2724 |
| S14 | Aspherical | 1.5670 | 0.2279 | | | −6.4549 |
| S15 | Spherical | Infinite | 0.1100 | 1.52 | 64.2 | |
| S16 | Spherical | Infinite | 0.4042 | | | |
| S17 | Spherical | Infinite | | | | |

In this example, each lens may use an aspherical lens, and each aspherical surface type x is limited by the following formula:

$$x = \frac{ch^2}{1 + \sqrt{1 - (k+1)c^2h^2}} + \sum A_i h^i \qquad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the curvature radius in the above Table 2); k is the conic coefficient (shown in the above Table 2); and Ai is a correction coefficient for the i-th order of the aspheric surface.

Table 3 below shows the coefficients of the higher order terms of each of the aspherical surfaces S1-S14 that can be used for each aspherical lens in this example.

TABLE 3

| Surface No. | A4 | A6 | A8 | A10 | A12 |
|---|---|---|---|---|---|
| S1 | 1.4100E−04 | 5.2819E−02 | −1.7533E−01 | 3.7040E−01 | −4.2946E−01 |
| S2 | −6.0590E−02 | 4.7830E−02 | 2.9203E−01 | −1.0040E+00 | 1.4358E+00 |
| S3 | −1.3547E−01 | 8.8934E−02 | 2.5071E−01 | −9.2800E−01 | 1.3686E+00 |
| S4 | −7.0880E−02 | 4.3933E−02 | 1.0105E−02 | −2.8090E−02 | 4.1582E−02 |
| S5 | −8.6040E−02 | −1.0005E−01 | 6.1823E−01 | −2.7804E+00 | 7.4881E+00 |
| S6 | −1.4186E−01 | 9.9935E−02 | −5.5614E−01 | 1.4347E+00 | −2.7105E+00 |
| S7 | −1.8288E−01 | 1.4129E−01 | −5.5846E−01 | 1.4081E+00 | −2.7618E+00 |
| S8 | −1.5391E−01 | 1.8459E−01 | −3.6159E−01 | 4.4382E−01 | −3.4557E−01 |
| S9 | −5.6360E−02 | 1.6625E−01 | −3.0213E−01 | 3.0522E−01 | −1.8379E−01 |
| S10 | 6.8635E−02 | −1.3568E−01 | 2.1013E−01 | −2.0667E−01 | 1.2934E−01 |
| S11 | 7.3545E−02 | −1.6039E−01 | 1.5030E−01 | −1.0809E−01 | 5.3637E−02 |
| S12 | 6.3654E−02 | −1.1240E−01 | 7.8434E−02 | −3.7350E−02 | 1.2276E−02 |
| S13 | −1.8916E−01 | 8.7448E−02 | −2.0810E−02 | 5.1130E−03 | −1.6700E−03 |
| S14 | −1.3549E−01 | 8.0590E−02 | −3.4970E−02 | 1.1049E−02 | −2.4500E−03 |

| Surface No. | A14 | A16 | A18 | A20 |
|---|---|---|---|---|
| S1 | 2.6449E−01 | −6.6850E−02 | 0.0000E+00 | 0.0000E+00 |
| S2 | −1.0015E+00 | 2.7617E−01 | 0.0000E+00 | 0.0000E+00 |
| S3 | −9.7908E−01 | 2.7914E−01 | 0.0000E+00 | 0.0000E+00 |
| S4 | −2.5030E−02 | 1.0331E−02 | 0.0000E+00 | 0.0000E+00 |
| S5 | −1.2599E+01 | 1.2942E+01 | −7.4542E+00 | 1.8344E+00 |
| S6 | 3.4850E+00 | −2.7560E+00 | 1.1790E+00 | −2.0332E−01 |
| S7 | 3.8196E+00 | −3.2524E+00 | 1.5251E+00 | −3.0051E−01 |
| S8 | 1.9837E−01 | −8.5730E−02 | 2.4322E−02 | −3.1700E−03 |
| S9 | 6.8808E−02 | −1.5940E−02 | 2.1250E−03 | −1.3000E−04 |
| S10 | −5.0260E−02 | 1.1770E−02 | −1.5300E−03 | 8.4900E−05 |
| S11 | −1.7510E−02 | 3.5440E−03 | −3.9000E−04 | 1.8100E−05 |
| S12 | −2.6900E−03 | 3.7200E−04 | −2.9000E−05 | 1.0400E−06 |
| S13 | 4.1100E−04 | −5.9000E−05 | 4.4200E−06 | −1.4000E−07 |
| S14 | 3.6400E−04 | −3.4000E−05 | 1.8300E−06 | −4.3000E−08 |

Figures 2, 3:
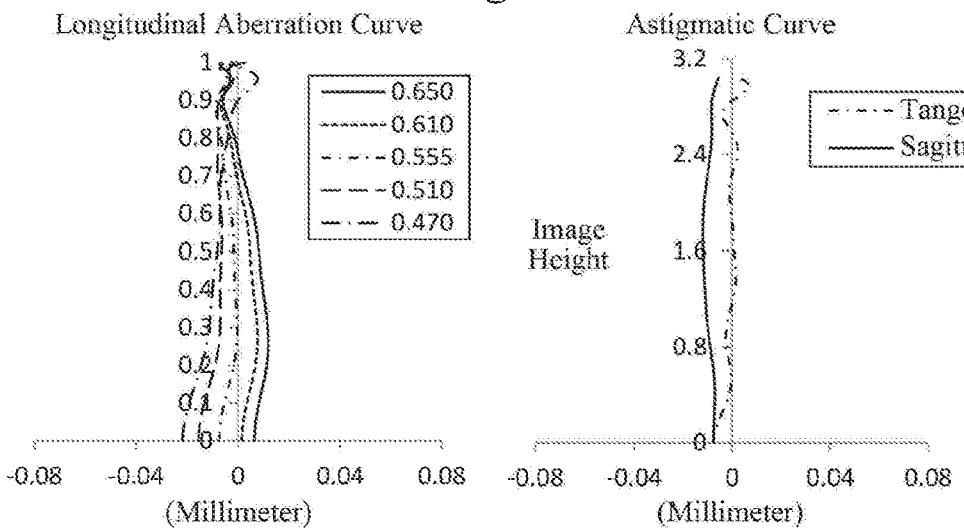
FIGS. 2 to 5 show a longitudinal aberration curve, an astigmatism curve, a distortion curve and a lateral color curve of the optical imaging lens assembly of Example 1, respectively.
Figures 4, 5:
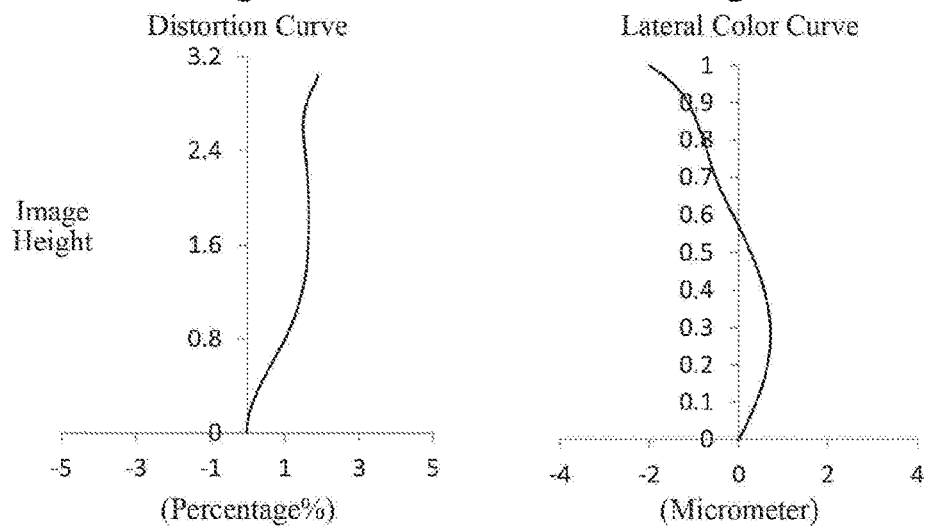

FIG. 2 illustrates a longitudinal aberration curve of the optical imaging system according to Example 1, representing deviations of focal points converged by light of different wavelengths after passing through the optical imaging system. FIG. 3 illustrates an astigmatism curve of the optical imaging system according to Example 1, representing a curvature of a tangential plane and a curvature of a sagittal plane. FIG. 4 illustrates a distortion curve of the optical imaging system according to Example 1, representing amounts of distortion corresponding to different FOVs. FIG. 5 illustrates a lateral color curve of the optical imaging system according to Example 1, representing deviations of different image heights on an image plane after light passes through the optical imaging system. It can be seen from FIG. 2 to FIG. 5 that the optical imaging system provided in Example 1 is suitable for portable electronic products and has a large aperture and good imaging quality.

Example 2

An optical imaging lens assembly according to Example 2 of the disclosure is described below with reference to FIGS. 6 to 10.

Figure 6:
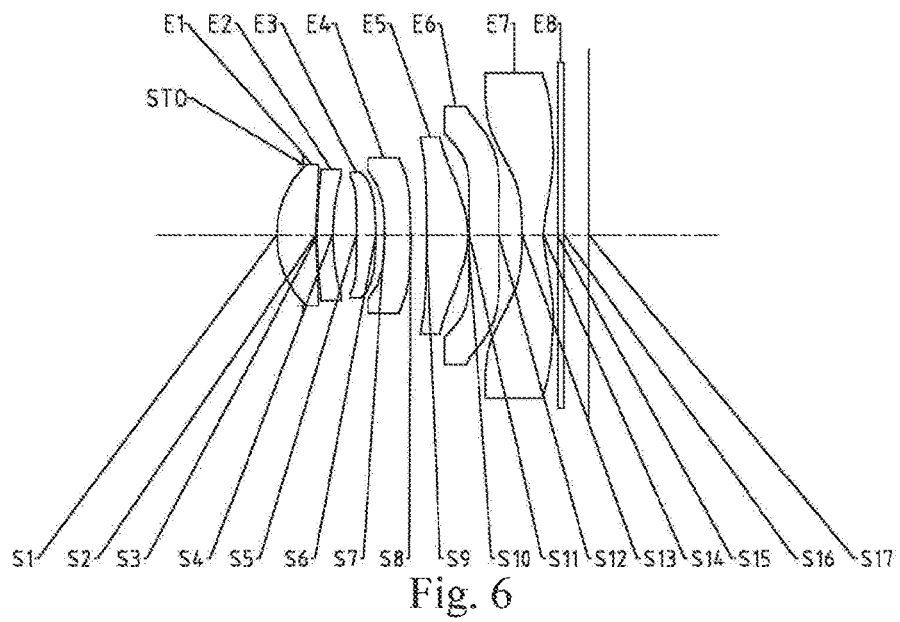
FIG. 6 shows a schematic structural diagram of an optical imaging lens assembly of Example 2.

FIG. 6 is a schematic structural diagram illustrating the optical imaging lens assembly of Example 2. As shown in FIG. 6, the optical imaging lens assembly includes seven lenses. The seven lenses are a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, a sixth lens E6 having an object side surface S11 and an image side surface S12, and a seventh lens E7 having an object side surface S13 and an image side surface S14, respectively. The first lens E1 to the seventh lens E7 are sequentially disposed from an object side to an image side of the optical imaging lens assembly.

The first lens E1 may have a positive refractive power. The object side surface S1 of the first lens E1 may be convex and the image side surface S2 of the first lens E1 is concave.

The second lens E2 may have a negative refractive power. The object side surface S3 of the second lens E2 may be convex and the image side surface S4 of the second lens E2 may be concave.

The third lens E3 may have a positive refractive power. The object side surface S5 of the third lens E3 may be convex, and the image side surface S6 of the third lens E3 may be convex.

The fourth lens E4 may have a negative refractive power. The object side surface S7 of the fourth lens E4 may be concave, and the image side surface S8 of the fourth lens E4 may be concave.

The fifth lens E5 may have a positive refractive power. The object side surface S9 of the fifth lens E5 may be concave, and the image side surface S10 of the fifth lens E5 may be convex.

The sixth lens E6 may have a negative refractive power. The object side surface S11 of the sixth lens E6 may be concave, and the image side surface S12 of the sixth lens E6 may be convex.

The seventh lens E7 may have a negative refractive power. The object side surface S13 of the seventh lens E7 may be concave, and the image side surface S14 of the seventh lens E7 may be concave.

The imaging camera further includes a filter E8 having an object side surface S15 and an image side surface S16 for filtering infrared light. In this example, the light from the object passes through the surfaces S1 to S16 in sequence and is finally imaged on the imaging surface S17.

Table 4 below shows effective focal lengths f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 4

| f1 (mm) | 3.95 | f (mm) | 3.94 |
|---|---|---|---|
| f2 (mm) | −15.47 | TTL (mm) | 5.10 |
| f3 (mm) | 16.69 | ImgH (mm) | 3.04 |

TABLE 4-continued

| f4 (mm) | −10.01 |
|---|---|
| f5 (mm) | 3.03 |
| f6 (mm) | −40.43 |
| f7 (mm) | −2.54 |

Table 5 shows the surface type, curvature radius, thickness, material, and conic coefficient of each of the lenses in the optical imaging lens assembly of this example, wherein both the curvature radius and the thickness are expressed in millimeters (mm).

TABLE 5

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.4318 | | | |
| S1 | Aspherical | 1.7121 | 0.6395 | 1.55 | 56.1 | 0.1025 |
| S2 | Aspherical | 7.1856 | 0.0250 | | | −99.0000 |
| S3 | Aspherical | 5.0000 | 0.2507 | 1.65 | 23.5 | 4.3243 |
| S4 | Aspherical | 3.2633 | 0.3915 | | | 5.1502 |
| S5 | Aspherical | 40.7435 | 0.3176 | 1.55 | 56.1 | −99.0000 |
| S6 | Aspherical | −11.7031 | 0.1463 | | | 98.4680 |
| S7 | Aspherical | −6.5350 | 0.4271 | 1.65 | 23.5 | 18.4472 |
| S8 | Aspherical | 463.4353 | 0.2607 | | | −99.0000 |
| S9 | Aspherical | −128.1530 | 0.6735 | 1.55 | 56.1 | 24.2521 |
| S10 | Aspherical | −1.6370 | 0.0250 | | | −2.1721 |
| S11 | Aspherical | −23.0000 | 0.4798 | 1.65 | 23.5 | −64.9719 |
| S12 | Aspherical | −200.0000 | 0.3716 | | | 99.0000 |
| S13 | Aspherical | −18.2972 | 0.3500 | 1.55 | 56.1 | 2.1275 |
| S14 | Aspherical | 1.5091 | 0.2274 | | | −7.4314 |
| S15 | Spherical | Infinite | 0.1100 | 1.52 | 64.2 | |
| S16 | Spherical | Infinite | 0.4042 | | | |
| S17 | Spherical | Infinite | | | | |

Table 6 below shows the coefficients of the higher order terms of each of the aspherical surfaces S1-S14 that can be used for each aspherical lens in this example. Each aspherical surface type may be defined by formula (1) given in Example 1 above.

TABLE 6

| Surface No. | A4 | A6 | A8 | A10 | A12 |
|---|---|---|---|---|---|
| S1 | 2.2100E−03 | 3.1379E−02 | −1.0027E−01 | 2.0497E−01 | −2.2741E−01 |
| S2 | −6.2090E−02 | 1.1515E−01 | −6.4790E−02 | −7.0990E−02 | 1.4514E−01 |
| S3 | −1.3934E−01 | 1.4267E−01 | −4.4660E−02 | −1.2731E−01 | 2.2575E−01 |
| S4 | −6.9030E−02 | 1.8105E−02 | 4.0100E−02 | −8.9660E−02 | 1.4093E−01 |
| S5 | −7.6670E−02 | −1.2640E−02 | −8.9730E−02 | −1.7189E−01 | 1.2458E+00 |
| S6 | −1.1717E−01 | 7.1514E−02 | −5.9413E−01 | 1.5526E+00 | −2.8078E+00 |
| S7 | −1.7405E−01 | 1.9017E−01 | −8.7945E−01 | 2.3583E+00 | −4.5264E+00 |
| S8 | −1.4195E−01 | 1.7698E−01 | −3.7740E−01 | 5.3731E−01 | −5.2119E−01 |
| S9 | −7.8640E−02 | 1.8742E−01 | −2.5828E−01 | 2.1511E−01 | −1.1828E−01 |
| S10 | 6.4125E−02 | −1.1156E−01 | 1.5962E−01 | −1.4171E−01 | 7.5450E−02 |
| S11 | 1.1662E−01 | −2.1898E−01 | 1.8564E−01 | −1.2168E−01 | 5.9462E−02 |
| S12 | 1.0017E−01 | −1.7811E−01 | 1.2655E−01 | −5.7780E−02 | 1.6722E−02 |
| S13 | −2.0999E−01 | 1.0203E−01 | −2.7000E−02 | 8.3070E−03 | −3.1400E−03 |
| S14 | −1.3361E−01 | 7.8996E−02 | −3.1880E−02 | 9.4240E−03 | −2.0000E−03 |

| Surface No. | A14 | A16 | A18 | A20 |
|---|---|---|---|---|
| S1 | 1.3348E−01 | −3.2710E−02 | 0.0000E+00 | 0.0000E+00 |
| S2 | −9.6720E−02 | 2.3369E−02 | 0.0000E+00 | 0.0000E+00 |
| S3 | −1.5181E−01 | 4.0663E−02 | 0.0000E+00 | 0.0000E+00 |
| S4 | −1.1165E−01 | 4.6760E−02 | 0.0000E+00 | 0.0000E+00 |
| S5 | −2.8083E+00 | 3.2673E+00 | −1.9626E+00 | 4.7386E−01 |
| S6 | 3.6195E+00 | −2.9722E+00 | 1.3489E+00 | −2.5634E−01 |
| S7 | 6.1440E+00 | −5.2556E+00 | 2.4803E+00 | −4.8706E−01 |
| S8 | 3.6575E−01 | −1.7952E−01 | 5.3777E−02 | −7.0300E−03 |
| S9 | 4.6298E−02 | −1.3490E−02 | 2.6670E−03 | −2.5000E−04 |

TABLE 6-continued

| S10 | −2.1710E−02 | 2.5730E−03 | 9.3500E−05 | −3.5000E−05 |
| S11 | −2.2200E−02 | 5.9870E−03 | −9.7000E−04 | 6.8100E−05 |
| S12 | −2.8000E−03 | 2.0500E−04 | 3.9000E−06 | −1.0000E−06 |
| S13 | 8.4100E−04 | −1.3000E−04 | 1.0800E−05 | −3.7000E−07 |
| S14 | 2.8700E−04 | −2.6000E−05 | 1.3900E−06 | −3.2000E−08 |

Figure 7:
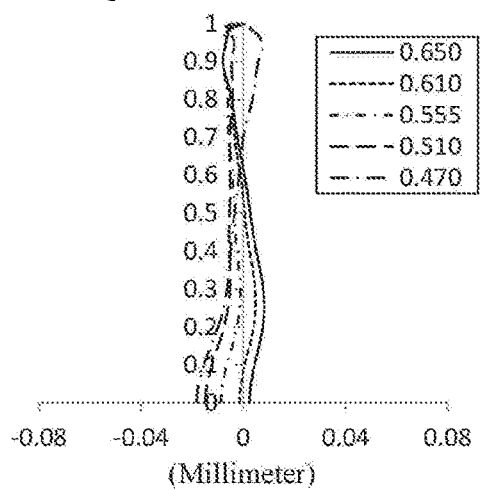
FIGS. 7 to 10 show a longitudinal aberration curve, an astigmatism curve, a distortion curve and a lateral color curve of the optical imaging lens assembly of Example 2, respectively.
Figure 8:
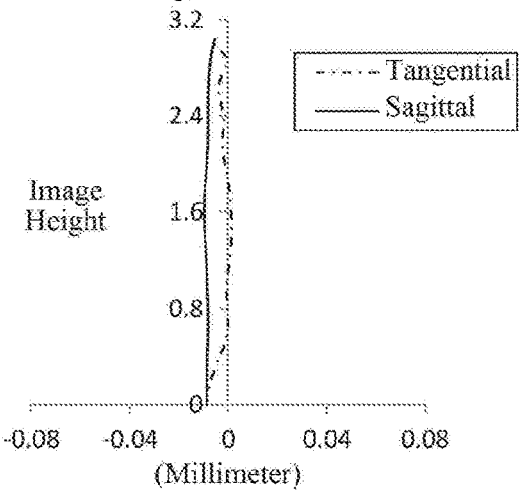
Figure 9:
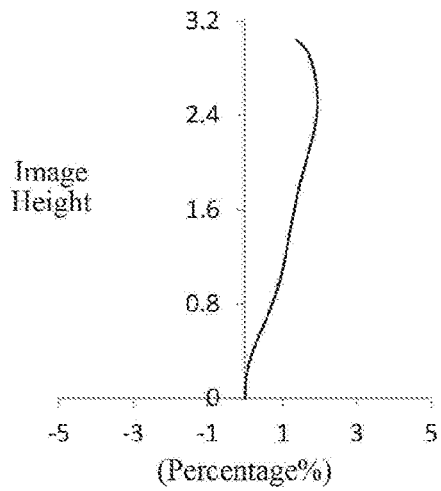
Figure 10:
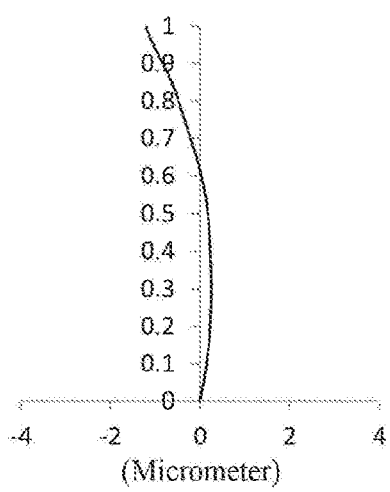

FIG. 7 illustrates a longitudinal aberration curve of the optical imaging system according to Example 2, representing deviations of focal points converged by light of different wavelengths after passing through the optical imaging system. FIG. 8 illustrates an astigmatism curve of the optical imaging system according to Example 2, representing a curvature of a tangential plane and a curvature of a sagittal plane. FIG. 9 illustrates a distortion curve of the optical imaging system according to Example 2, representing amounts of distortion corresponding to different FOVs. FIG. 10 illustrates a lateral color curve of the optical imaging system according to Example 2, representing deviations of different image heights on an image plane after light passes through the optical imaging system. It can be seen from FIG. 7 to FIG. 10 that the optical imaging system provided in Example 2 is suitable for portable electronic products and has a large aperture and good imaging quality.

Example 3

An optical imaging lens assembly according to Example 3 of the disclosure is described below with reference to FIGS. 11 to 15.

Figure 11:
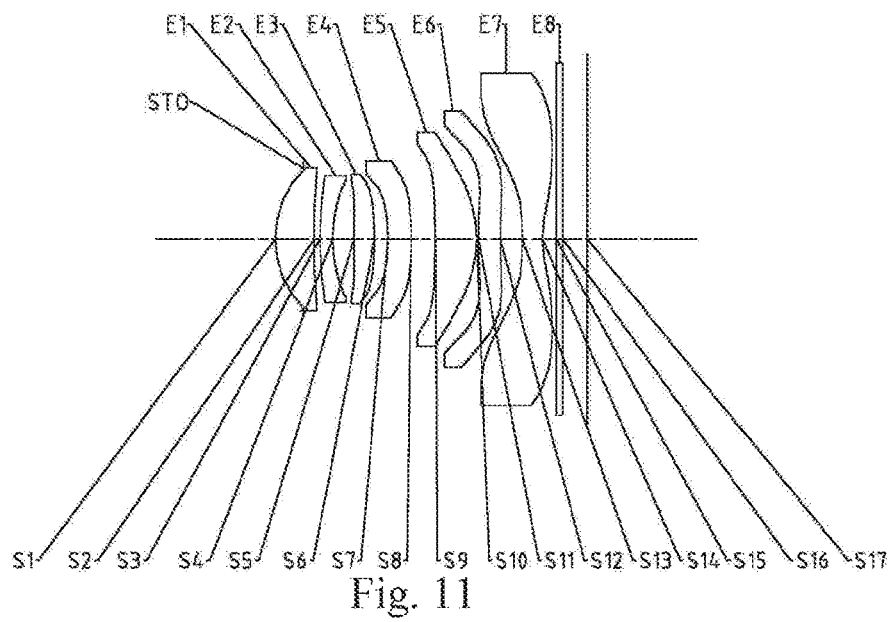
FIG. 11 shows a schematic structural diagram of an optical imaging lens assembly of Example 3.

FIG. 11 is a schematic structural diagram illustrating the optical imaging lens assembly of Example 3. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and an image side surface S10 of the fifth lens E5 may be convex.

The sixth lens E6 may have a positive refractive power. An object side surface S11 of the sixth lens E6 may be convex, and an image side surface S12 of the sixth lens E6 may be concave.

The seventh lens E7 may have a negative refractive power. An object side surface S13 of the seventh lens E7 may be concave, and an image side surface S14 of the seventh lens E7 may be concave.

Table 7 below shows effective focal lengths f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 7

| f1 (mm) | 3.33 | f (mm) | 4.09 |
| f2 (mm) | −6.30 | TTL (mm) | 5.14 |
| f3 (mm) | 10.84 | ImgH (mm) | 3.04 |
| f4 (mm) | −13.74 | | |
| f5 (mm) | 3.74 | | |
| f6 (mm) | 36.41 | | |
| f7 (mm) | −2.43 | | |

Table 8 shows the surface type, curvature radius, thickness, material, and conic coefficient of each of the lenses in the optical imaging lens assembly of this example, wherein both the curvature radius and the thickness are expressed in millimeters (mm).

TABLE 8

| Surface No. | Surface Type | Curvature Radius | Thickness | Material Refractive Index | Material Abbe Number | Conic Coefficient |
| --- | --- | --- | --- | --- | --- | --- |
| OBJ | Spherical | Infinite | Infinite | | | |
| STO | Spherical | Infinite | −0.4557 | | | |
| S1 | Aspherical | 1.6984 | 0.6420 | 1.55 | 56.1 | 0.0696 |
| S2 | Aspherical | 22.2601 | 0.0939 | | | −97.2981 |
| S3 | Aspherical | 5.1143 | 0.2100 | 1.65 | 23.5 | 11.7269 |
| S4 | Aspherical | 2.2252 | 0.3543 | | | 1.4787 |
| S5 | Aspherical | 13.1162 | 0.3367 | 1.55 | 56.1 | 66.6301 |
| S6 | Aspherical | −10.6805 | 0.2198 | | | 88.6554 |
| S7 | Aspherical | −4.8967 | 0.3840 | 1.65 | 23.5 | 17.6424 |
| S8 | Aspherical | −11.3107 | 0.4050 | | | −24.3040 |
| S9 | Aspherical | −18.6388 | 0.6700 | 1.55 | 56.1 | 79.7154 |
| S10 | Aspherical | −1.8651 | 0.0250 | | | −1.4119 |
| S11 | Aspherical | 16.0000 | 0.3648 | 1.65 | 23.5 | −99.0000 |
| S12 | Aspherical | 50.0000 | 0.3617 | | | −0.8337 |
| S13 | Aspherical | −9.4786 | 0.3318 | 1.55 | 56.1 | −51.4708 |
| S14 | Aspherical | 1.5630 | 0.2275 | | | −7.4930 |

TABLE 8-continued

| Surface No. | Surface Type | Curvature Radius | Thickness | Material Refractive Index | Abbe Number | Conic Coefficient |
|---|---|---|---|---|---|---|
| S15 | Spherical | Infinite | 0.1100 | 1.52 | 64.2 | |
| S16 | Spherical | Infinite | 0.4042 | | | |
| S17 | Spherical | Infinite | | | | |

Table 9 below shows the coefficients of the higher order terms of each of the aspherical surfaces S1-S14 that can be used for each aspherical lens in this example, wherein each aspherical surface type may be defined by formula (1) given in Example 1 above.

TABLE 9

| Surface No. | A4 | A6 | A8 | A10 | A12 | A14 | A16 | A18 | A20 |
|---|---|---|---|---|---|---|---|---|---|
| S1 | 4.0180E−03 | 2.0190E−03 | 2.2320E−03 | −3.6900E−03 | 6.1260E−03 | −4.5000E−03 | 1.2020E−03 | 0.0000E+00 | 0.0000E+00 |
| S2 | −1.9360E−02 | 9.4442E−02 | −1.4838E−01 | 1.4677E−01 | −9.2300E−02 | 3.3503E−02 | −5.1800E−03 | 0.0000E+00 | 0.0000E+00 |
| S3 | −1.3153E−01 | 2.4135E−01 | −3.3186E−01 | 3.2562E−01 | −2.1386E−01 | 9.0772E−02 | −1.9300E−02 | 0.0000E+00 | 0.0000E+00 |
| S4 | −1.2842E−01 | 2.0077E−01 | −2.6899E−01 | 3.2184E−01 | −2.6490E−01 | 1.4862E−01 | −2.6620E−02 | 0.0000E+00 | 0.0000E+00 |
| S5 | −8.3514E−02 | 2.9669E−02 | −2.0133E−01 | 5.7268E−01 | −1.1321E+00 | 1.4837E+00 | −1.2103E+00 | 5.8213E−01 | −1.2731E−01 |
| S6 | −1.1124E−01 | 1.1794E−02 | −8.1380E−02 | 7.9920E−02 | 1.1122E−01 | −4.3105E−01 | 5.7243E−01 | −3.5667E−01 | 8.4644E−02 |
| S7 | −1.5781E−01 | −1.0670E−01 | 2.2101E−01 | −1.1147E+00 | 2.9994E+00 | −4.7436E+00 | 4.4963E+00 | −2.3669E+00 | 5.3305E−01 |
| S8 | −1.2473E−01 | 4.6973E−02 | −6.8730E−02 | 4.7972E−02 | 4.0086E−02 | −1.0946E−01 | 9.4225E−02 | −3.9410E−02 | 6.8690E−03 |
| S9 | −3.6716E−02 | 1.0094E−01 | −1.9640E−01 | 2.1949E−01 | −1.7117E−01 | 9.1993E−02 | −3.2440E−02 | 6.6710E−03 | −5.9000E−04 |
| S10 | 4.7327E−02 | −6.3310E−02 | 8.0676E−02 | −8.8650E−02 | 6.8776E−02 | −3.5300E−02 | 1.1282E−02 | −2.0000E−03 | 1.4800E−04 |
| S11 | 1.0162E−01 | −2.2159E−01 | 1.7382E−01 | −1.0307E−01 | 4.8742E−02 | −1.8120E−02 | 4.7610E−03 | −7.3000E−04 | 4.8200E−05 |
| S12 | 1.4784E−01 | −2.7728E−01 | 2.1083E−01 | −1.0764E−01 | 3.9161E−02 | −1.0090E−02 | 1.7480E−03 | −1.8000E−04 | 8.2800E−06 |
| S13 | −1.6770E−01 | 3.9052E−02 | 2.9822E−02 | −2.4310E−02 | 8.4690E−03 | −1.7200E−03 | 2.0800E−04 | −1.4000E−05 | 4.1300E−07 |
| S14 | −1.3281E−01 | 7.4781E−02 | −2.5470E−02 | 5.8790E−03 | −1.0000E−03 | 1.2800E−04 | −1.2000E−05 | 6.4800E−07 | −1.7000E−08 |

Figures 12, 13:
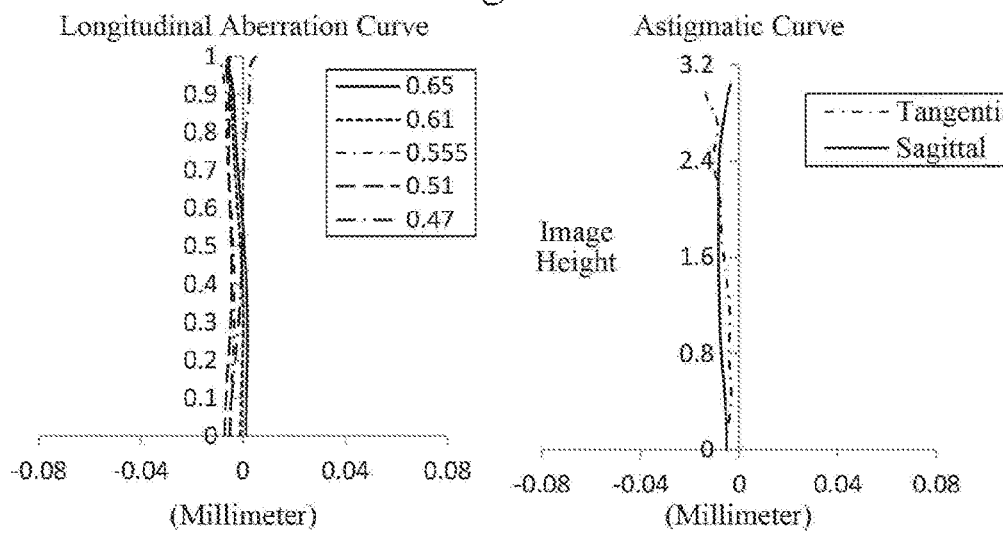
FIGS. 12 to 15 show a longitudinal aberration curve, an astigmatism curve, a distortion curve and a lateral color curve of the optical imaging lens assembly of Example 3, respectively.
Figures 14, 15:
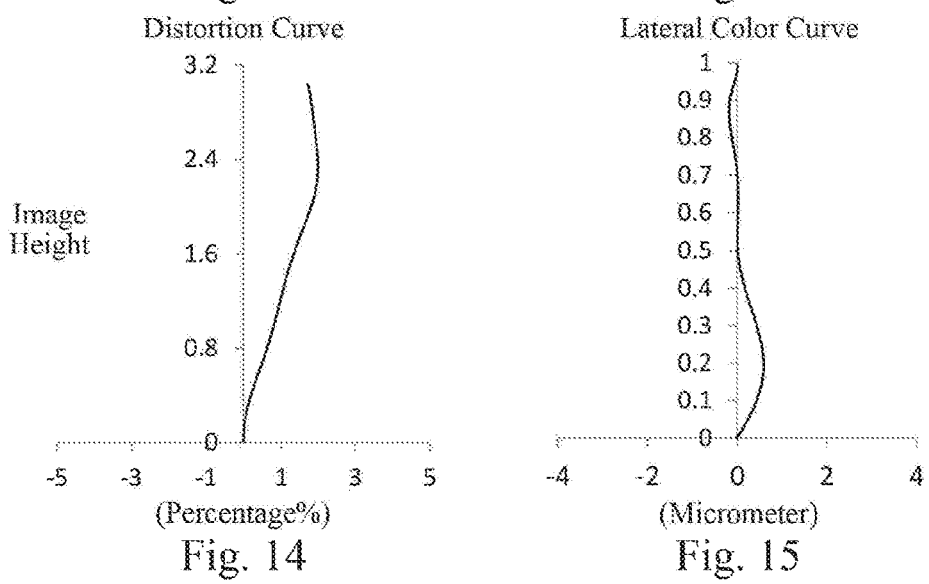

FIG. 12 illustrates a longitudinal aberration curve of the optical imaging system according to Example 3, representing deviations of focal points converged by light of different wavelengths after passing through the optical imaging system. FIG. 13 illustrates an astigmatism curve of the optical imaging system according to Example 3, representing a curvature of a tangential plane and a curvature of a sagittal plane. FIG. 14 illustrates a distortion curve of the optical imaging system according to Example 3, representing amounts of distortion corresponding to different FOVs. FIG. 15 illustrates a lateral color curve of the optical imaging system according to Example 3, representing deviations of different image heights on an image plane after light passes through the optical imaging system. It can be seen from FIG. 12 to FIG. 15 that the optical imaging system provided in Example 3 is suitable for portable electronic products and has a large aperture and good imaging quality.

Example 4

An optical imaging lens assembly according to Example 4 of the disclosure is described below with reference to FIGS. 16 to 20.

Figure 16:
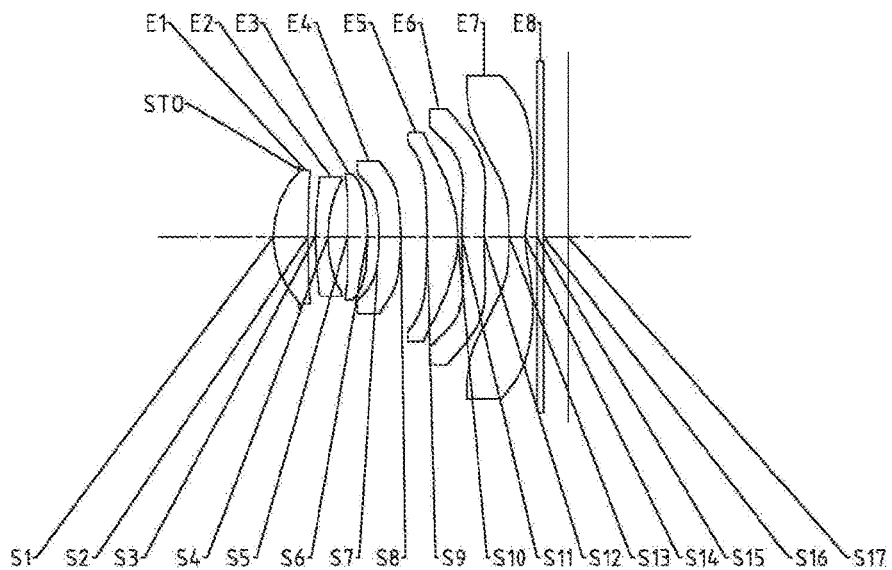
FIG. 16 shows a schematic structural diagram of the optical imaging lens assembly of Example 4.

FIG. 16 is a schematic structural diagram illustrating the optical imaging lens assembly of Example 4. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and the image side surface S10 of the fifth lens E5 may be convex.

The sixth lens E6 may have a positive refractive power. An object side surface S11 of the sixth lens E6 may be convex, and an image side surface S12 of the sixth lens E6 may be convex.

The seventh lens E7 may have a negative refractive power. An object side surface S13 of the seventh lens E7 may be concave, and an image side surface S14 of the seventh lens E7 may be concave.

Table 10 below shows effective focal length f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 10

| | | | |
|---|---|---|---|
| f1 (mm) | 3.25 | f (mm) | 3.91 |
| f2 (mm) | −5.82 | TTL (mm) | 4.85 |
| f3 (mm) | 10.14 | ImgH (mm) | 3.04 |
| f4 (mm) | −19.32 | | |
| f5 (mm) | 4.36 | | |
| f6 (mm) | 21.61 | | |
| f7 (mm) | −2.45 | | |

Table 11 below shows the surface type, curvature radius, thickness, material, and conic coefficient of each of the lenses in the optical imaging lens assembly in this example, wherein both the curvature radius and the thickness are expressed in millimeters (mm).

TABLE 11

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.4291 | | | |
| S1 | Aspherical | 1.6407 | 0.5720 | 1.55 | 56.1 | 0.0562 |
| S2 | Aspherical | 19.3098 | 0.1195 | | | −98.4759 |
| S3 | Aspherical | 4.7717 | 0.2100 | 1.65 | 23.5 | 11.0211 |
| S4 | Aspherical | 2.0629 | 0.3204 | | | 1.5715 |
| S5 | Aspherical | 12.2592 | 0.3286 | 1.55 | 56.1 | 65.3270 |
| S6 | Aspherical | −10.0005 | 0.1951 | | | 89.1622 |
| S7 | Aspherical | −4.7712 | 0.3575 | 1.65 | 23.5 | 17.7676 |
| S8 | Aspherical | −7.9704 | 0.4352 | | | 2.1491 |
| S9 | Aspherical | −14.3698 | 0.5053 | 1.55 | 56.1 | 55.9279 |
| S10 | Aspherical | −2.0671 | 0.0632 | | | −1.4260 |
| S11 | Aspherical | 14.5767 | 0.3647 | 1.65 | 23.5 | −54.1682 |
| S12 | Aspherical | −300.0000 | 0.4042 | | | −99.0000 |
| S13 | Aspherical | −11.9497 | 0.2600 | 1.55 | 56.1 | −9.7314 |
| S14 | Aspherical | 1.5182 | 0.1998 | | | −7.7260 |
| S15 | Spherical | Infinite | 0.1100 | 1.52 | 64.2 | |
| S16 | Spherical | Infinite | 0.4042 | | | |
| S17 | Spherical | Infinite | | | | |

Table 12 below shows the coefficients of the higher order terms of each of the aspherical surfaces S1-S14 that can be used for each of the aspherical surface lenses in this example, wherein each aspherical surface type may be defined by formula (1) given in the above Example 1.

TABLE 12

| Surface No. | A4 | A6 | A8 | A10 | A12 | A14 | A16 | A18 | A20 |
|---|---|---|---|---|---|---|---|---|---|
| S1 | 3.3000E−03 | 2.4350E−03 | 2.2500E−04 | 3.6300E−04 | 1.0020E−03 | −1.5900E−03 | 5.7900E−04 | 0.0000E+00 | 0.0000E+00 |
| S2 | −2.1030E−02 | 8.9680E−02 | −1.5059E−01 | 1.7617E−01 | −1.4032E−01 | 6.6866E−02 | −1.4020E−02 | 0.0000E+00 | 0.0000E+00 |
| S3 | −1.4090E−01 | 2.5411E−01 | −3.3460E−01 | 3.1129E−01 | −1.8939E−01 | 7.5004E−02 | −1.7060E−02 | 0.0000E+00 | 0.0000E+00 |
| S4 | −1.3969E−01 | 2.2743E−01 | −2.8672E−01 | 3.0860E−01 | −2.3113E−01 | 1.3538E−01 | −2.3460E−02 | 0.0000E+00 | 0.0000E+00 |
| S5 | −8.5730E−02 | 3.7429E−02 | −2.5877E−01 | 8.9774E−01 | −2.2628E+00 | 3.7613E+00 | −3.8881E+00 | 2.3035E+00 | −5.9143E−01 |
| S6 | −1.1918E−01 | 4.4041E−02 | −2.2687E−01 | 5.5321E−01 | −9.5025E−01 | 1.0442E+00 | −6.6205E−01 | 2.2591E−01 | −3.6890E−02 |
| S7 | −1.6705E−01 | −3.3400E−02 | 4.6526E−01 | −2.2351E+00 | 6.0551E+00 | −9.9471E+00 | 9.8426E+00 | −5.3874E+00 | 1.2544E+00 |
| S8 | −1.3170E−01 | 3.0846E−02 | 1.8209E−02 | −2.1543E−01 | 5.2442E−01 | −6.6851E−01 | 4.8726E−01 | −1.9327E−01 | 3.2687E−02 |
| S9 | −4.1665E−02 | 1.3797E−01 | −2.8158E−01 | 3.3781E−01 | −2.7920E−01 | 1.5589E−01 | −5.6300E−02 | 1.1818E−02 | −1.0800E−03 |
| S10 | 2.8928E−02 | −1.5570E−02 | −3.5700E−03 | 1.3004E−02 | −5.7200E−03 | −3.8100E−03 | 4.0350E−03 | −1.2100E−03 | 1.2200E−04 |
| S11 | 1.2179E−01 | −2.7611E−01 | 2.1286E−01 | −1.0474E−01 | 3.8736E−02 | −1.3460E−02 | 3.9240E−03 | −6.7000E−04 | 4.6700E−05 |
| S12 | 2.0678E−01 | −3.7426E−01 | 2.9940E−01 | −1.5493E−01 | 5.5206E−02 | −1.3790E−02 | 2.3370E−03 | −2.4000E−04 | 1.0900E−05 |
| S13 | −1.7652E−01 | 3.4654E−02 | 3.8970E−02 | −2.9120E−02 | 9.7810E−03 | −1.9200E−03 | 2.2600E−04 | −1.5000E−05 | 4.1900E−07 |
| S14 | −1.4614E−01 | 7.3685E−02 | −1.9750E−02 | 1.9380E−03 | 3.9000E−04 | −1.6000E−04 | 2.1800E−05 | −1.4000E−06 | 3.7600E−08 |

Figure 17:
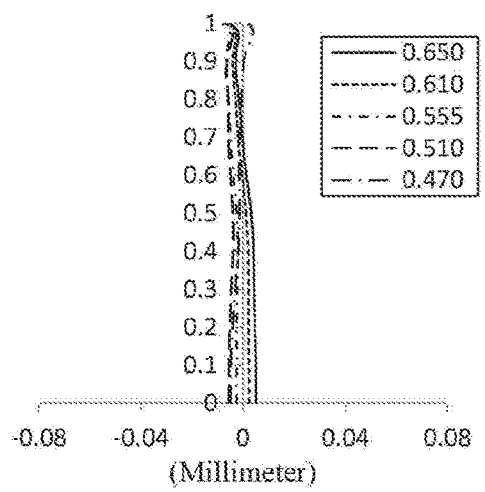
FIGS. 17 to 20 show a longitudinal aberration curve, an astigmatism curve, a distortion curve and a lateral color curve of the optical imaging lens assembly of Example 4, respectively.
Figure 18:
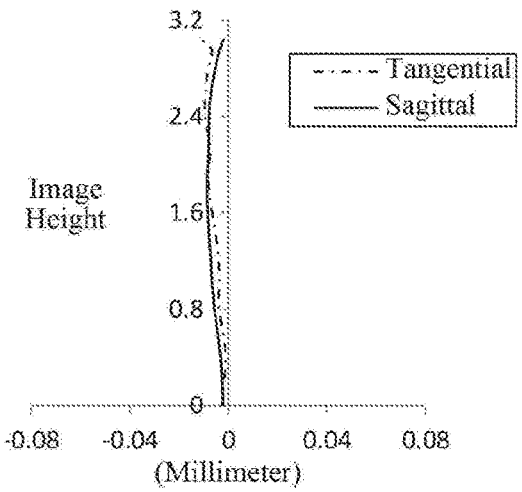
Figure 19:
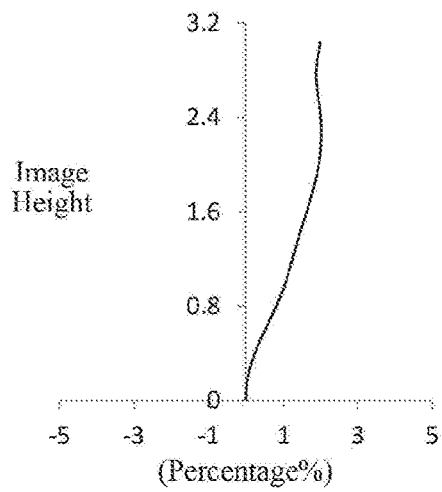
Figure 20:
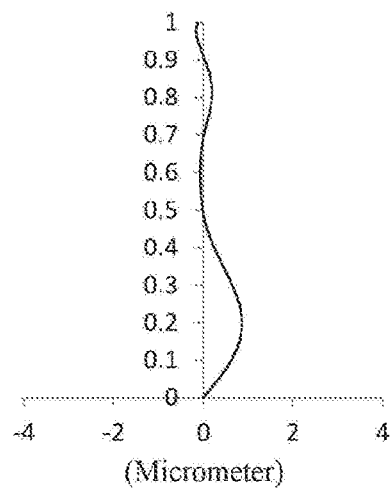

FIG. 17 illustrates a longitudinal aberration curve of the optical imaging system according to Example 4, representing deviations of focal points converged by light of different wavelengths after passing through the optical imaging system. FIG. 18 illustrates an astigmatism curve of the optical imaging system according to Example 4, representing a curvature of a tangential plane and a curvature of a sagittal plane. FIG. 19 illustrates a distortion curve of the optical imaging system according to Example 4, representing amounts of distortion corresponding to different FOVs. FIG. 20 illustrates a lateral color curve of the optical imaging system according to Example 4, representing deviations of different image heights on an image plane after light passes through the optical imaging system. It can be seen from FIG. 17 to FIG. 20 that the optical imaging system provided in Example 4 is suitable for portable electronic products and has a large aperture and good imaging quality.

Example 5

An optical imaging lens assembly according to Example 5 of the disclosure is described below with reference to FIGS. 21 to 25.

Figure 21:
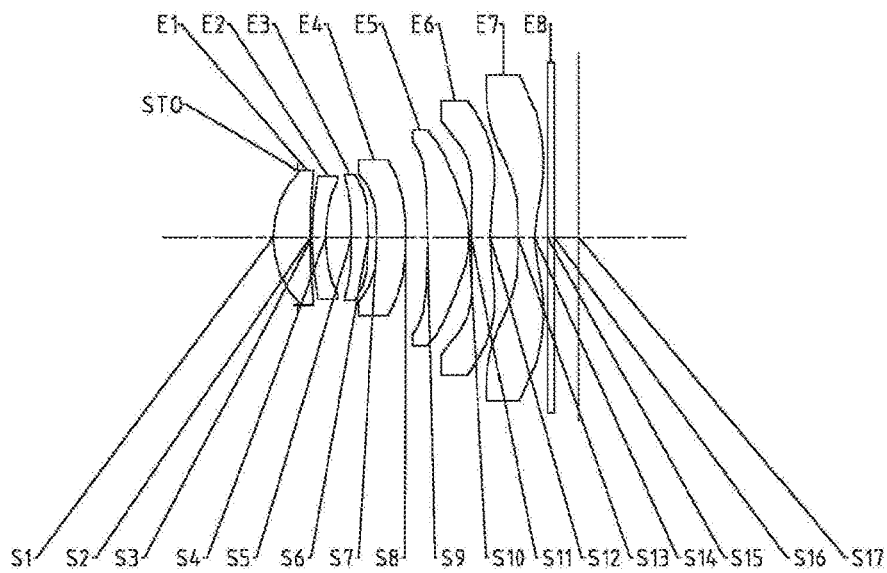
FIG. 21 shows a schematic structural diagram of an optical imaging lens assembly of Example 5.

FIG. 21 is a schematic structural diagram illustrating an optical imaging lens assembly of Example 5. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave and The second lens E2 may have a negative refractive power. An object side surface S3 of the second lens E2 may be convex and an image side surface S4 of the second lens E2 may be concave.

The third lens E3 may have a negative refractive power. An object side surface S5 of the third lens E3 may be concave, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and an image side surface S10 of the fifth lens E5 may be convex.

The sixth lens E6 may have a negative refractive power. An object side surface S11 of the sixth lens E6 may be convex, and an image side surface S12 of the sixth lens E6 may be concave.

The seventh lens E7 may have a negative refractive power. An object side surface S13 of the seventh lens E7 may be convex, and the image side surface S14 of the seventh lens E7 may be concave.

Table 13 below shows effective focal length f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 13

| f1 (mm) | 3.34 | f (mm) | 3.99 |
|---|---|---|---|
| f2 (mm) | −8.95 | TTL (mm) | 5.04 |
| f3 (mm) | −403.59 | ImgH (mm) | 3.04 |
| f4 (mm) | −176.90 | | |
| f5 (mm) | 3.06 | | |
| f6 (mm) | −9.80 | | |
| f7 (mm) | −2.93 | | |

Table 14 below shows the surface type, curvature radius, thickness, material, and conic coefficient of each of the lenses in the optical imaging lens assembly in this example, wherein both the curvature radius and the thickness are expressed in millimeters (mm).

TABLE 14

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| STO | Spherical | Infinite | −0.4036 | | | |
| S1 | Aspherical | 1.6678 | 0.6142 | 1.55 | 56.1 | 0.1533 |
| S2 | Aspherical | 17.2448 | 0.0250 | | | 99.0000 |
| S3 | Aspherical | 4.7416 | 0.2304 | 1.65 | 23.5 | −8.9974 |
| S4 | Aspherical | 2.5510 | 0.4277 | | | 2.8400 |
| S5 | Aspherical | −15.0000 | 0.2750 | 1.55 | 56.1 | 63.6685 |
| S6 | Aspherical | −16.2000 | 0.1401 | | | 99.0000 |
| S7 | Aspherical | −7.2468 | 0.4735 | 1.65 | 23.5 | 25.6581 |
| S8 | Aspherical | −7.9376 | 0.3693 | | | −35.4814 |
| S9 | Aspherical | −25.7141 | 0.6850 | 1.55 | 56.1 | −99.0000 |
| S10 | Aspherical | −1.5811 | 0.0322 | | | −1.4505 |
| S11 | Aspherical | 26.5114 | 0.3162 | 1.65 | 23.5 | 99.0000 |
| S12 | Aspherical | 5.0704 | 0.4490 | | | −30.1238 |
| S13 | Aspherical | 56.4244 | 0.2722 | 1.55 | 56.1 | −99.0000 |
| S14 | Aspherical | 1.5514 | 0.2163 | | | −5.9081 |
| S15 | Spherical | Infinite | 0.1100 | 1.52 | 64.2 | |
| S16 | Spherical | Infinite | 0.4042 | | | |
| S17 | Spherical | Infinite | | | | |

Table 15 below shows the coefficients of the higher order terms of each of the aspherical surfaces S1-S14 that can be used for each of the aspherical lenses in this example, wherein each aspherical surface type may be defined by formula (1) given in Example 1 above.

TABLE 15

| Surface No. | A4 | A6 | A8 | A10 | A12 | A14 | A16 | A18 | A20 |
|---|---|---|---|---|---|---|---|---|---|
| S1 | 1.7250E−03 | 1.5453E−02 | −3.1040E−02 | 4.9826E−02 | −4.1370E−02 | 1.8834E−02 | −3.7600E−03 | 0.0000E+00 | 0.0000E+00 |
| S2 | 1.5204E−02 | 1.5654E−02 | −9.3430E−02 | 1.8583E−01 | −1.9139E−01 | 9.9669E−02 | −2.0680E−02 | 0.0000E+00 | 0.0000E+00 |
| S3 | −7.1067E−03 | 1.0768E−03 | 3.3760E−03 | 3.5990E−03 | 1.4010E−03 | 1.7200E−13 | −1.6000E−14 | −1.5000E−15 | −1.3000E−16 |
| S4 | −4.6370E−02 | 1.1812E−02 | 1.3471E−02 | −4.1800E−02 | 1.2825E−01 | −1.4454E−01 | 8.0093E−02 | 0.0000E+00 | 0.0000E+00 |
| S5 | −1.0066E−01 | 1.4840E−01 | −8.9789E−01 | 3.0484E+00 | −6.8506E+00 | 1.0037E+01 | −9.0510E+00 | 4.5561E+00 | −9.7325E−01 |
| S6 | −1.9991E−01 | 3.1375E−01 | −1.4169E+00 | 3.8999E+00 | −7.2420E+00 | 9.0139E+00 | −7.0252E+00 | 3.0572E+00 | −5.6114E−01 |
| S7 | −2.0165E−01 | 2.3211E−01 | −9.7484E−01 | 2.6402E+00 | −5.0474E+00 | 6.6115E+00 | −5.4152E+00 | 2.4395E+00 | −4.5220E−01 |
| S8 | −1.2919E−01 | 1.2431E−01 | −2.5998E−01 | 3.9739E−01 | −4.1259E−01 | 2.9337E−01 | −1.3712E−01 | 3.7406E−02 | −4.2300E−03 |
| S9 | −7.1767E−02 | 1.5493E−01 | −2.1266E−01 | 1.7706E−01 | −9.4600E−02 | 3.2899E−02 | −8.0600E−03 | 1.3810E−03 | −1.2000E−04 |

TABLE 15-continued

| Surface No. | A4 | A6 | A8 | A10 | A12 | A14 | A16 | A18 | A20 |
|---|---|---|---|---|---|---|---|---|---|
| S10 | 9.7981E−02 | −7.6954E−02 | 8.0850E−02 | −1.1229E−01 | 1.1041E−01 | −6.3150E−02 | 2.0300E−02 | −3.4200E−03 | 2.3600E−04 |
| S11 | 8.1765E−02 | −1.3391E−01 | 3.6456E−02 | 2.0154E−02 | −2.1300E−02 | 8.9030E−03 | −2.1200E−03 | 2.8300E−04 | −1.6000E−05 |
| S12 | 8.6159E−02 | −1.6471E−01 | 1.0721E−01 | −4.2940E−02 | 1.1623E−02 | −2.0700E−03 | 2.1700E−04 | −1.0000E−05 | 6.8900E−08 |
| S13 | −1.7655E−01 | 4.8995E−02 | 1.5298E−02 | −1.2660E−02 | 3.5200E−03 | −5.3000E−04 | 4.5400E−05 | −2.1000E−06 | 4.0100E−08 |
| S14 | −1.4818E−01 | 8.0499E−02 | −3.2410E−02 | 1.0372E−02 | −2.4700E−03 | 3.9300E−04 | −3.8000E−05 | 2.0200E−06 | −4.5000E−08 |

Figure 22:
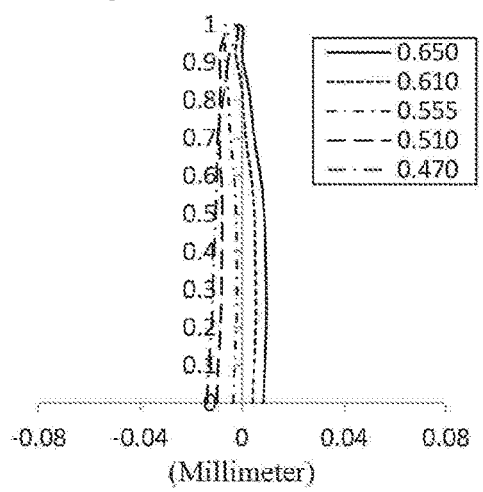
FIGS. 22 to 25 show a longitudinal aberration curve, an astigmatism curve, a distortion curve and a lateral color curve of the optical imaging lens assembly of Example 5, respectively.
Figure 23:
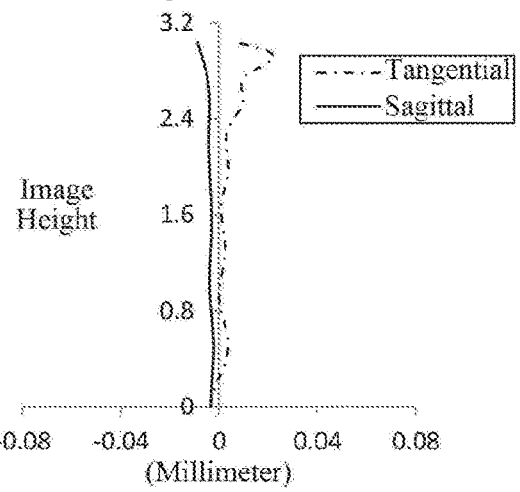
Figure 24:
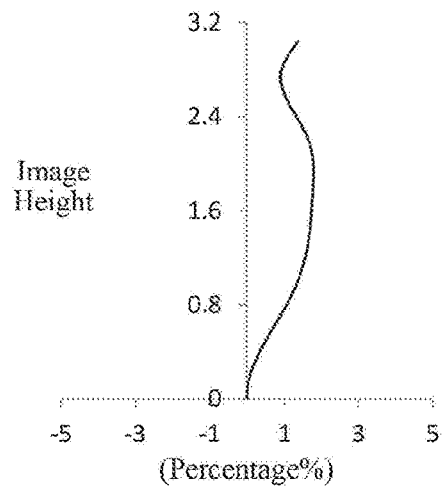
Figure 25:
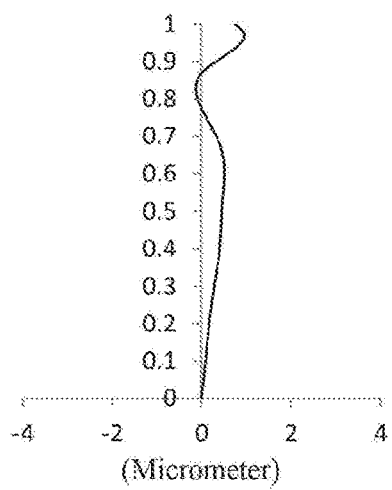

FIG. 22 illustrates a longitudinal aberration curve of the optical imaging system according to Example 5, representing deviations of focal points converged by light of different wavelengths after passing through the optical imaging system. FIG. 23 illustrates an astigmatism curve of the optical imaging system according to Example 5, representing a curvature of a tangential plane and a curvature of a sagittal plane. FIG. 24 illustrates a distortion curve of the optical imaging system according to Example 5, representing amounts of distortion corresponding to different FOVs. FIG. 25 illustrates a lateral color curve of the optical imaging system according to Example 5, representing deviations of different image heights on an image plane after light passes through the optical imaging system. It can be seen from FIG. 22 to FIG. 25 that the optical imaging system provided in Example 5 is suitable for portable electronic products and has a large aperture and good imaging quality.

Example 6

An optical imaging lens assembly according to Example 6 of the disclosure is described below with reference to FIGS. 26 to 30.

Figure 26:
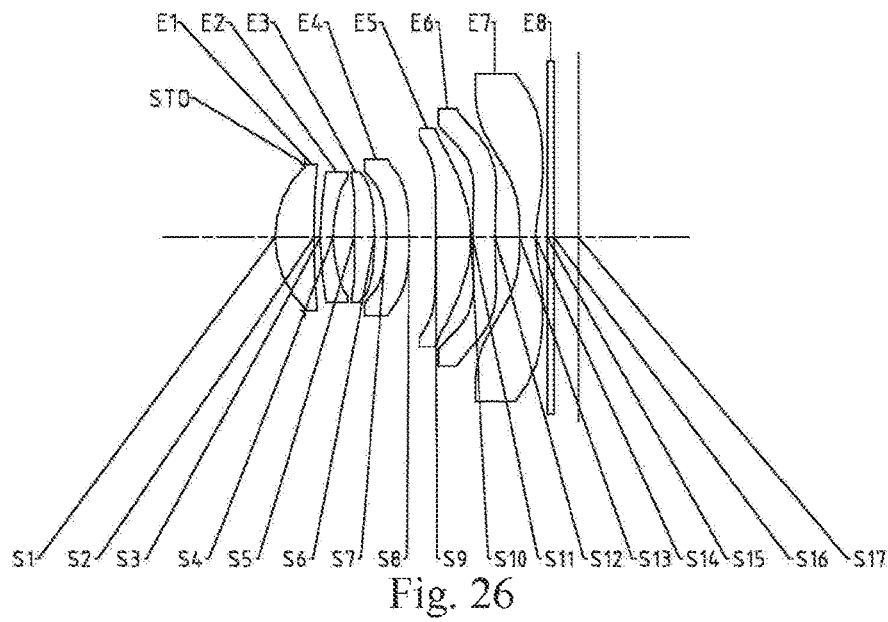
FIG. 26 shows a schematic structural diagram of the optical imaging lens assembly of Example 6.

FIG. 26 is a schematic structural diagram illustrating the optical imaging lens assembly of Example 6. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be convex, and an image side surface S10 of the fifth lens E5 may be convex.

The sixth lens E6 may have a positive refractive power. An object side surface S11 of the sixth lens E6 may be convex, and an image side surface S12 of the sixth lens E6 may be concave.

The seventh lens E7 may have a negative refractive power. An object side surface S13 of the seventh lens E7 may be concave, and an image side surface S14 of the seventh lens E7 may be concave.

Table 16 below shows effective focal length f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 16

| f1 (mm) | 3.30 | f (mm) | 3.98 |
|---|---|---|---|
| f2 (mm) | −5.99 | TTL (mm) | 5.00 |
| f3 (mm) | 10.69 | ImgH (mm) | 3.04 |
| f4 (mm) | −17.29 | | |
| f5 (mm) | 3.96 | | |
| f6 (mm) | 38.09 | | |
| f7 (mm) | −2.48 | | |

Table 17 below shows the surface type, curvature radius, thickness, material, and conic coefficient of each of the lenses in the optical imaging lens assembly in this example, wherein both the curvature radius and the thickness are expressed in millimeters (mm).

TABLE 17

| | | | | Materials | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| STO | Spherical | Infinite | −0.4966 | | | |
| S1 | Aspherical | 1.6867 | 0.6457 | 1.55 | 56.1 | 0.0615 |
| S2 | Aspherical | 23.0974 | 0.1055 | | | −94.7017 |
| S3 | Aspherical | 5.0647 | 0.2100 | 1.65 | 23.5 | 11.4534 |
| S4 | Aspherical | 2.1524 | 0.3490 | | | 1.4754 |
| S5 | Aspherical | 13.2168 | 0.3359 | 1.55 | 56.1 | 68.8007 |
| S6 | Aspherical | −10.3615 | 0.1977 | | | 88.5853 |
| S7 | Aspherical | −4.8338 | 0.3732 | 1.65 | 23.5 | 17.6141 |
| S8 | Aspherical | −8.8044 | 0.4391 | | | 5.0041 |
| S9 | Aspherical | 500.0000 | 0.5805 | 1.55 | 56.1 | −99.0000 |
| S10 | Aspherical | −2.1725 | 0.0257 | | | −1.3688 |
| S11 | Aspherical | 17.0419 | 0.3716 | 1.65 | 23.5 | −99.0000 |

TABLE 17-continued

| Surface No. | Surface Type | Curvature Radius | Thickness | Materials | | Conic Coefficient |
| | | | | Refractive Index | Abbe Number | |
| --- | --- | --- | --- | --- | --- | --- |
| S12 | Aspherical | 55.4673 | 0.3968 | | | 95.7146 |
| S13 | Aspherical | −11.0043 | 0.2600 | 1.55 | 56.1 | −1.6413 |
| S14 | Aspherical | 1.5538 | 0.1951 | | | −7.4457 |
| S15 | Spherical | Infinite | 0.1100 | 1.52 | 64.2 | |
| S16 | Spherical | Infinite | 0.4042 | | | |
| S17 | Spherical | Infinite | | | | |

Table 18 below shows the coefficients of the higher order terms of each of the aspherical surfaces S1-S14 that can be used for each of the aspherical surface lenses in this example, wherein each aspherical surface type may be defined by formula (1) given in the above example 1.

TABLE 18

| Surface No. | A4 | A6 | A8 | A10 | A12 | A14 | A16 | A18 | A20 |
| --- | --- | --- | --- | --- | --- | --- | --- | --- | --- |
| S1 | 2.9090E−03 | 5.6770E−03 | −9.8300E−03 | 1.7598E−02 | −1.5430E−02 | 7.2170E−03 | −1.4600E−03 | 0.0000E+00 | 0.0000E+00 |
| S2 | −1.9100E−02 | 8.6256E−02 | −1.2836E−01 | 1.2043E−01 | −7.2050E−02 | 2.4953E−02 | −3.8000E−03 | 0.0000E+00 | 0.0000E+00 |
| S3 | −1.3577E−01 | 2.4483E−01 | −3.1980E−01 | 2.9056E−01 | −1.7189E−01 | 6.4246E−02 | −1.2310E−02 | 0.0000E+00 | 0.0000E+00 |
| S4 | −1.3345E−01 | 2.0860E−01 | −2.4874E−01 | 2.2894E−01 | −1.0687E−01 | 1.3799E−02 | 2.1254E−02 | 0.0000E+00 | 0.0000E+00 |
| S5 | −8.5941E−02 | 6.5282E−02 | −3.9949E−01 | 1.2936E+00 | −2.7981E+00 | 3.8990E+00 | −3.3398E+00 | 1.6227E+00 | −3.4272E−01 |
| S6 | −1.1217E−01 | 1.3737E−02 | 1.3863E−02 | −4.0401E−01 | 1.3590E+00 | −2.3454E+00 | 2.3215E+00 | −1.2329E+00 | 2.6989E−01 |
| S7 | −1.5899E−01 | −3.8693E−02 | 5.2710E−01 | −2.3499E+00 | 5.8866E+00 | −8.9276E+00 | 8.1798E+00 | −4.1688E+00 | 9.0913E−01 |
| S8 | −1.3263E−01 | 4.7609E−02 | −2.7040E−02 | −8.7870E−02 | 2.7016E−01 | −3.4856E−01 | 2.4642E−01 | −9.3930E−02 | 1.5313E−02 |
| S9 | −4.9077E−02 | 1.2362E−01 | −2.2393E−01 | 2.4556E−01 | −1.8621E−01 | 9.5474E−02 | −3.1590E−02 | 6.0500E−03 | −5.0000E−04 |
| S10 | 3.3765E−02 | −3.3139E−02 | 3.6122E−02 | −3.7610E−02 | 2.9874E−02 | −1.7090E−02 | 6.2040E−03 | −1.2100E−03 | 9.6100E−05 |
| S11 | 1.0592E−01 | −2.5046E−01 | 1.9351E−01 | −9.8570E−02 | 3.6713E−02 | −1.1880E−02 | 3.2040E−03 | −5.3000E−04 | 3.5200E−05 |
| S12 | 1.7581E−01 | −3.3785E−01 | 2.7132E−01 | −1.4236E−01 | 5.1533E−02 | −1.2900E−02 | 2.1410E−03 | −2.1000E−04 | 9.1100E−06 |
| S13 | −1.9181E−01 | 4.0481E−02 | 4.3609E−02 | −3.4270E−02 | 1.1919E−02 | −2.4000E−03 | 2.8800E−04 | −1.9000E−05 | 5.4600E−07 |
| S14 | −1.5883E−01 | 8.7715E−02 | −2.8130E−02 | 5.6290E−03 | −7.4000E−04 | 6.7200E−05 | −4.7000E−06 | 2.7700E−07 | −9.5000E−09 |

Figure 27:
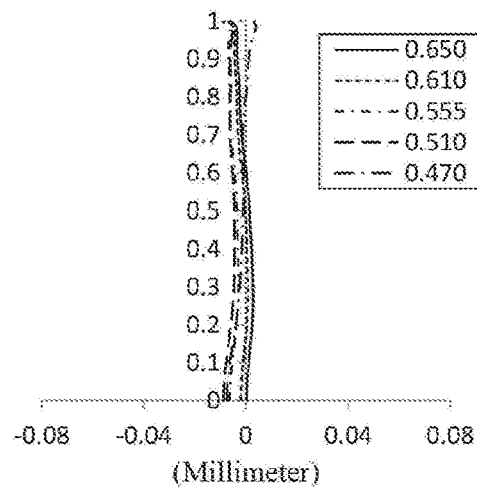
FIGS. 27 to 30 show a longitudinal aberration curve, an astigmatism curve, a distortion curve and a lateral color curve of the optical imaging lens assembly of Example 6, respectively.
Figure 28:
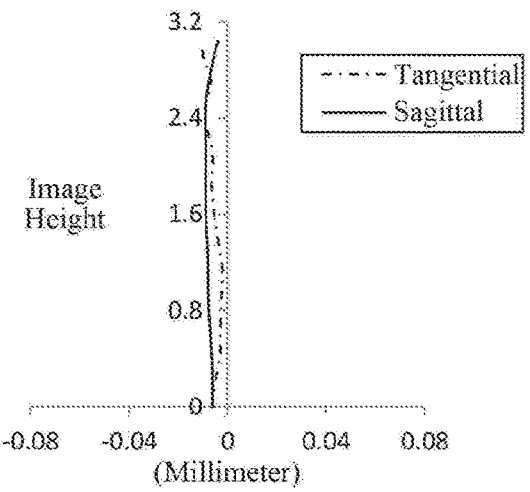
Figure 29:
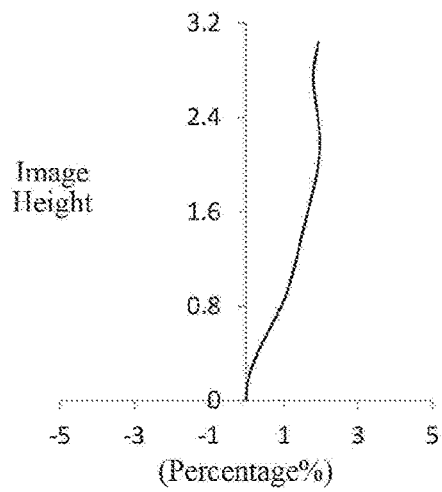
Figure 30:
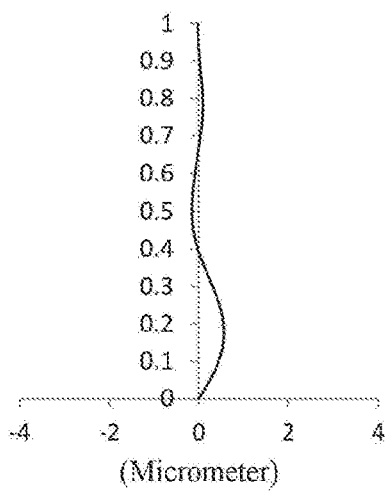

FIG. 27 illustrates a longitudinal aberration curve of the optical imaging system according to Example 6, representing deviations of focal points converged by light of different wavelengths after passing through the optical imaging system. FIG. 28 illustrates an astigmatism curve of the optical imaging system according to Example 6, representing a curvature of a tangential plane and a curvature of a sagittal plane. FIG. 29 illustrates a distortion curve of the optical imaging system according to Example 6, representing amounts of distortion corresponding to different FOVs. FIG. 30 illustrates a lateral color curve of the optical imaging system according to Example 6, representing deviations of different image heights on an image plane after light passes through the optical imaging system. It can be seen from FIG. 27 to FIG. 30 that the optical imaging system provided in Example 6 is suitable for portable electronic products and has a large aperture and good imaging quality.

Example 7

An optical imaging lens assembly according to Example 7 of the disclosure is described below with reference to FIGS. 31 to 35.

Figure 31:
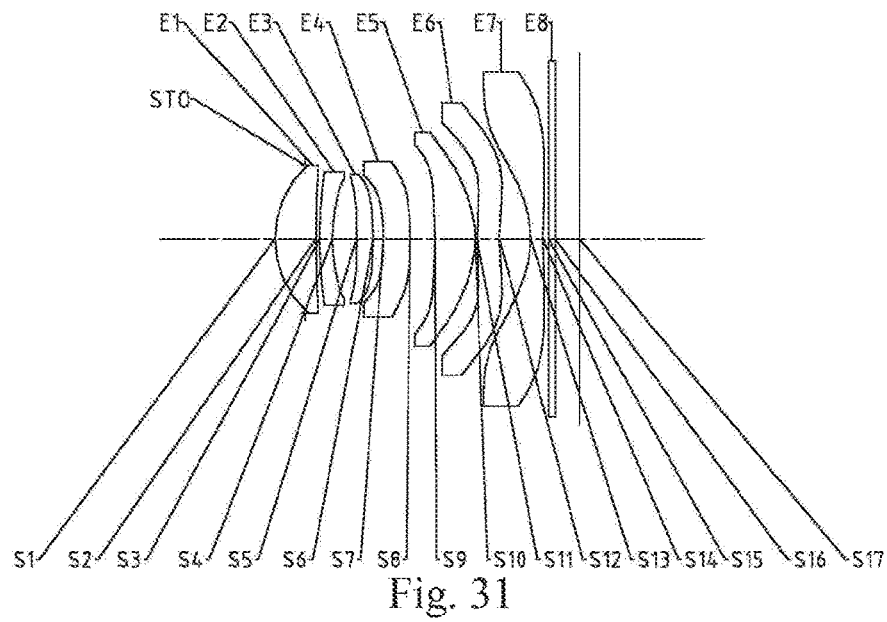
FIG. 31 shows a schematic structural diagram of an optical imaging lens assembly of Example 7.

FIG. 31 is a schematic structural diagram illustrating an optical imaging lens assembly of Example 7. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be concave, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and an image side surface S10 of the fifth lens E5 may be convex.

The sixth lens E6 may have a negative refractive power. An object side surface S11 of the sixth lens E6 may be convex, and an image side surface S12 of the sixth lens E6 may be concave.

The seventh lens E7 may have a negative refractive power. An object side surface S13 of the seventh lens E7 may be concave, and the image side surface S14 of the seventh lens E7 may be concave.

Table 19 below shows effective focal lengths f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 19

| | | | |
|---|---|---|---|
| f1 (mm) | 3.29 | f (mm) | 4.00 |
| f2 (mm) | −7.62 | TTL (mm) | 5.04 |
| f3 (mm) | 20.21 | ImgH (mm) | 3.07 |
| f4 (mm) | −24.74 | | |
| f5 (mm) | 3.68 | | |
| f6 (mm) | −24.25 | | |
| f7 (mm) | −2.70 | | |

Table 20 below shows the surface type, curvature radius, thickness, material, and conic coefficient of each of the lenses in the optical imaging lens assembly of this example, wherein both the curvature radius and the thickness are expressed in millimeters (mm).

TABLE 20

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.4976 | | | |
| S1 | Aspherical | 1.6959 | 0.6795 | 1.55 | 56.1 | 0.1389 |
| S2 | Aspherical | 26.4205 | 0.0620 | | | −99.0000 |
| S3 | Aspherical | 5.8572 | 0.2105 | 1.65 | 23.5 | 7.9633 |
| S4 | Aspherical | 2.6319 | 0.3984 | | | 1.7235 |
| S5 | Aspherical | −79.5554 | 0.2803 | 1.55 | 56.1 | −99.0000 |
| S6 | Aspherical | −9.6998 | 0.1684 | | | 2.5632 |
| S7 | Aspherical | −5.2340 | 0.4406 | 1.65 | 23.5 | 20.7564 |
| S8 | Aspherical | −8.0541 | 0.4094 | | | 23.3320 |
| S9 | Aspherical | −11.5791 | 0.6700 | 1.55 | 56.1 | −61.0168 |
| S10 | Aspherical | −1.7480 | 0.0262 | | | −1.0745 |
| S11 | Aspherical | 4.5289 | 0.3654 | 1.65 | 23.5 | −40.1088 |
| S12 | Aspherical | 3.3992 | 0.5182 | | | −22.6748 |
| S13 | Aspherical | −1.8369 | 0.2000 | 1.55 | 56.1 | −3.3946 |
| S14 | Aspherical | 7.7208 | 0.0934 | | | −83.3943 |
| S15 | Spherical | Infinite | 0.1100 | 1.52 | 64.2 | |
| S16 | Spherical | Infinite | 0.4042 | | | |
| S17 | Spherical | Infinite | | | | |

Table 21 below shows the coefficients of the higher order terms of each of the aspherical surfaces S1-S14 that can be used for each of the aspherical surface lenses in this example, wherein each aspherical surface type may be defined by formula (1) given in the above Example 1.

TABLE 21

| Surface No. | A4 | A6 | A8 | A10 | A12 | A14 | A16 | A18 | A20 |
|---|---|---|---|---|---|---|---|---|---|
| S1 | −1.1000E−04 | 1.7892E−02 | −4.4950E−02 | 7.5512E−02 | −6.9080E−02 | 3.3996E−02 | −7.0900E−03 | 0.0000E+00 | 0.0000E+00 |
| S2 | −5.4320E−02 | 1.8366E−01 | −2.7700E−01 | 2.5549E−01 | −1.4363E−01 | 4.4636E−02 | −5.9200E−03 | 0.0000E+00 | 0.0000E+00 |
| S3 | −1.5816E−01 | 3.3063E−01 | −4.6726E−01 | 4.3502E−01 | −2.4033E−01 | 6.9169E−02 | −8.0400E−03 | 3.7640E−03 | −2.1100E−03 |
| S4 | −1.2163E−01 | 1.8611E−01 | −1.8827E−01 | 7.4125E−02 | 1.3342E−01 | −1.7857E−01 | 8.0133E−02 | 0.0000E+00 | 0.0000E+00 |
| S5 | −9.2800E−02 | 3.4590E−02 | −1.7848E−01 | 5.0201E−01 | −9.0718E−01 | 9.8824E−01 | −5.2899E−01 | 7.6411E−02 | 2.3655E−02 |
| S6 | −1.2582E−01 | −4.2008E−02 | 2.1599E−01 | −8.8255E−01 | 2.0854E+00 | −3.0062E+00 | 2.6632E+00 | −1.3297E+00 | 2.8277E−01 |
| S7 | −1.2488E−01 | −1.0527E−01 | 5.1962E−01 | −1.8567E+00 | 4.1401E+00 | −5.7972E+00 | 5.0396E+00 | −2.4918E+00 | 5.3719E−01 |
| S8 | −7.4873E−02 | −1.9914E−02 | 2.2267E−02 | −1.0530E−02 | −1.8180E−02 | 4.7130E−02 | −4.0130E−02 | 1.5264E−02 | −2.0100E−03 |
| S9 | 1.9573E−02 | −3.3480E−02 | −4.1900E−03 | 2.5517E−02 | −3.7060E−02 | 2.7385E−02 | −1.0920E−02 | 2.2270E−03 | −1.8000E−04 |
| S10 | 6.9441E−02 | −8.9088E−02 | 1.1654E−01 | −1.0718E−01 | 5.9480E−02 | −2.0610E−02 | 4.5950E−03 | −6.2000E−04 | 3.8800E−05 |
| S11 | −4.6439E−02 | −5.8547E−02 | 6.8529E−02 | −4.3920E−02 | 1.4051E−02 | −1.1100E−03 | −5.6000E−04 | 1.6200E−04 | −1.3000E−05 |
| S12 | −6.9075E−02 | −8.5600E−05 | 4.1560E−03 | 1.0620E−03 | −2.4600E−03 | 1.2390E−03 | −3.0000E−04 | 3.7000E−05 | −1.8000E−06 |
| S13 | −5.3273E−02 | 3.3982E−02 | −1.2640E−02 | 4.8780E−03 | −1.5800E−03 | 3.4200E−04 | −4.5000E−05 | 3.2800E−06 | −1.0000E−07 |
| S14 | −3.8817E−02 | 2.0321E−02 | −5.8800E−03 | 4.0000E−04 | 2.3800E−04 | −7.9000E−05 | 1.0900E−05 | −7.2000E−07 | 1.8500E−08 |

Figures 32, 33:
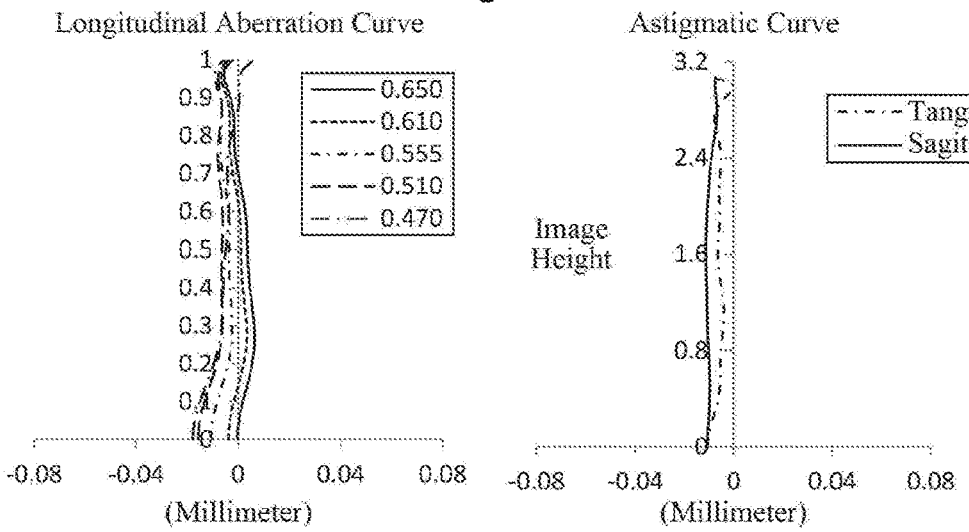
FIGS. 32 to 35 show a longitudinal aberration curve, an astigmatism curve, a distortion curve and a lateral color curve of the optical imaging lens assembly of Example 7, respectively.
Figures 34, 35:
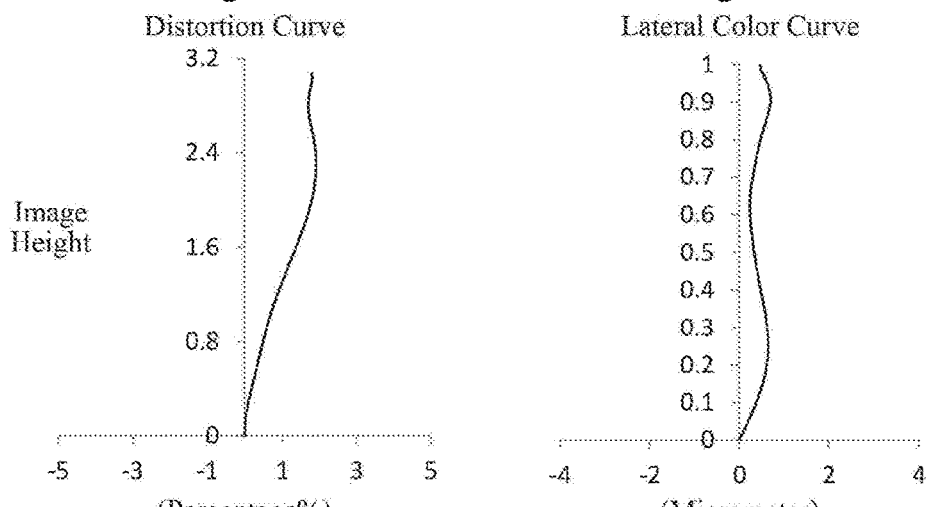

FIG. 32 illustrates a longitudinal aberration curve of the optical imaging system according to Example 7, representing deviations of focal points converged by light of different wavelengths after passing through the optical imaging system. FIG. 33 illustrates an astigmatism curve of the optical imaging system according to Example 7, representing a curvature of a tangential plane and a curvature of a sagittal plane. FIG. 34 illustrates a distortion curve of the optical imaging system according to Example 7, representing amounts of distortion corresponding to different FOVs. FIG. 35 illustrates a lateral color curve of the optical imaging system according to Example 7, representing deviations of different image heights on an image plane after light passes through the optical imaging system. It can be seen from FIG. 32 to FIG. 35 that the optical imaging system provided in Example 7 is suitable for portable electronic products and has a large aperture and good imaging quality.

Example 8

An optical imaging lens assembly according to Example 8 of the disclosure is described below with reference to FIGS. 36 to 40.

Figure 36:
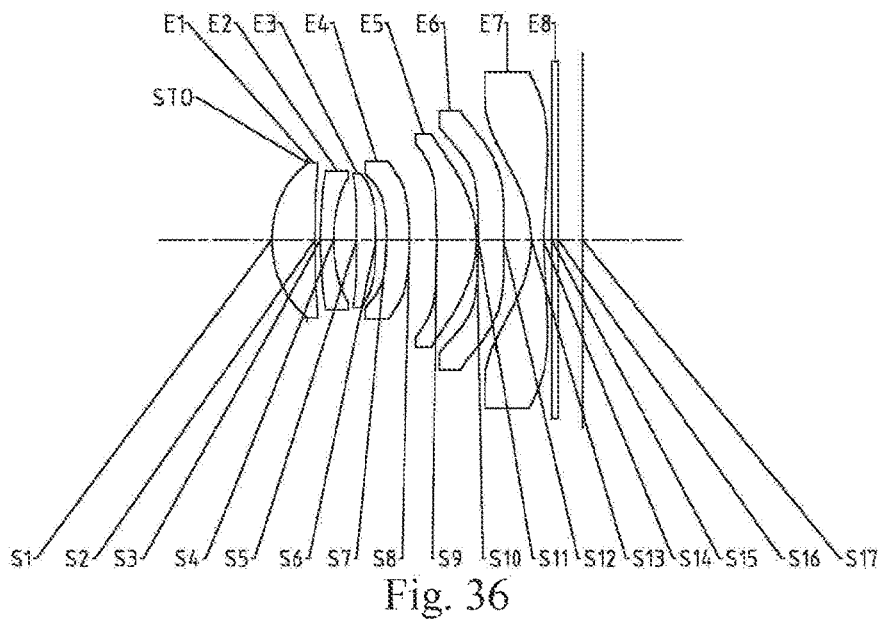
FIG. 36 shows a schematic structural diagram of the optical imaging lens assembly of Example 8.

FIG. 36 is a schematic structural diagram illustrating the optical imaging lens assembly of Example 8. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and an image side surface S10 of the fifth lens E5 may be convex.

The sixth lens E6 may have a negative refractive power. An object side surface S11 of the sixth lens E6 may be concave, and an image side surface S12 of the sixth lens E6 may be concave.

The seventh lens E7 may have a negative refractive power. An object side surface S13 of the seventh lens E7 may be concave, and an image side surface S14 of the seventh lens E7 may be concave.

Table 22 below shows effective focal length f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 22

| f1 (mm) | 3.40 | f (mm) | 4.12 |
|---|---|---|---|
| f2 (mm) | −6.38 | TTL (mm) | 5.17 |
| f3 (mm) | 12.02 | ImgH (mm) | 3.12 |
| f4 (mm) | −26.54 | | |
| f5 (mm) | 3.23 | | |
| f6 (mm) | −18.98 | | |
| f7 (mm) | −2.52 | | |

Table 23 below shows the surface type, curvature radius, thickness, material, and conical coefficient of each of the lenses in the optical imaging lens assembly of this example, wherein both the curvature radius and the thickness are expressed in millimeters (mm).

TABLE 23

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| STO | Spherical | Infinite | −0.5924 | | | |
| S1 | Aspherical | 1.7376 | 0.7260 | 1.55 | 56.1 | 0.1147 |
| S2 | Aspherical | 22.8651 | 0.0881 | | | −28.8011 |
| S3 | Aspherical | 5.5508 | 0.2170 | 1.65 | 23.5 | 8.4478 |
| S4 | Aspherical | 2.3237 | 0.3878 | | | 1.4262 |
| S5 | Aspherical | 14.0210 | 0.3216 | 1.55 | 56.1 | −94.8371 |
| S6 | Aspherical | −12.2305 | 0.1844 | | | −42.7914 |
| S7 | Aspherical | −5.5068 | 0.3732 | 1.65 | 23.5 | 21.7658 |
| S8 | Aspherical | −8.3427 | 0.4589 | | | 31.1394 |
| S9 | Aspherical | −13.8047 | 0.6620 | 1.55 | 56.1 | −36.3041 |
| S10 | Aspherical | −1.5891 | 0.0250 | | | −1.1812 |
| S11 | Aspherical | −74.1945 | 0.4078 | 1.65 | 23.5 | 99.0000 |
| S12 | Aspherical | 14.6551 | 0.4646 | | | 10.0411 |
| S13 | Aspherical | −2.0716 | 0.2000 | 1.55 | 56.1 | −2.4486 |
| S14 | Aspherical | 4.2333 | 0.1417 | | | −29.7935 |
| S15 | Spherical | Infinite | 0.1100 | 1.52 | 64.2 | |
| S16 | Spherical | Infinite | 0.4042 | | | |
| S17 | Spherical | Infinite | | | | |

Table 24 below shows the coefficients of the higher order terms of each of the aspherical surfaces S1-S14 that can be used for each of the aspherical surface lenses in this example, wherein each aspherical surface type may be defined by formula (1) given in the above Example 1.

TABLE 24

| Surface No. | A4 | A6 | A8 | A10 | A12 | A14 | A16 | A18 | A20 |
|---|---|---|---|---|---|---|---|---|---|
| S1 | 1.2420E−03 | 2.1570E−03 | −1.0800E−03 | 1.7560E−03 | −8.0000E−04 | 2.5300E−04 | −8.8000E−05 | 0.0000E+00 | 0.0000E+00 |
| S2 | −3.9730E−02 | 1.3593E−01 | −2.0751E−01 | 2.0462E−01 | −1.2793E−01 | 4.5642E−02 | −7.0200E−03 | 0.0000E+00 | 0.0000E+00 |
| S3 | −1.5004E−01 | 3.1038E−01 | −4.6394E−01 | 5.2703E−01 | −4.4236E−01 | 2.7487E−01 | −1.2337E−01 | 3.7560E−02 | −6.0200E−03 |
| S4 | −1.3126E−01 | 2.1452E−01 | −2.3885E−01 | 1.3550E−01 | 8.5715E−02 | −1.6314E−01 | 7.6924E−02 | 0.0000E+00 | 0.0000E+00 |
| S5 | −7.8233E−02 | 1.8429E−02 | −5.7390E−02 | −1.7716E−01 | 1.0145E+00 | −2.1301E+00 | 2.3739E+00 | −1.3682E+00 | 3.2388E−01 |
| S6 | −1.0017E−01 | −1.3683E−01 | 6.2009E−01 | −2.1340E+00 | 4.5115E+00 | −5.9198E+00 | 4.7579E+00 | −2.1440E+00 | 4.1301E−01 |
| S7 | −1.1643E−01 | −6.4557E−02 | 2.9219E−01 | −1.1494E+00 | 2.7362E+00 | −3.9637E+00 | 3.5242E+00 | −1.7712E+00 | 3.8395E−01 |
| S8 | −7.5609E−02 | −3.3648E−02 | 1.1295E−01 | −2.7965E−01 | 4.3645E−01 | −4.1519E−01 | 2.3938E−01 | −7.8390E−02 | 1.1405E−02 |
| S9 | −2.8649E−03 | −1.7954E−02 | 1.4708E−02 | −2.7040E−02 | 1.7152E−02 | −2.5000E−03 | −1.8100E−03 | 8.1300E−04 | −9.4000E−05 |

TABLE 24-continued

| Surface No. | A4 | A6 | A8 | A10 | A12 | A14 | A16 | A18 | A20 |
|---|---|---|---|---|---|---|---|---|---|
| S10 | 8.1185E−02 | −8.3114E−02 | 1.0975E−01 | −1.3179E−01 | 9.8856E−02 | −4.6130E−02 | 1.3455E−02 | −2.2500E−03 | 1.6300E−04 |
| S11 | −6.1204E−02 | 2.4709E−02 | −2.2540E−02 | 3.9800E−04 | 5.9990E−03 | −2.8400E−03 | 6.4100E−04 | −7.5000E−05 | 3.5900E−06 |
| S12 | −1.1352E−01 | 8.1313E−02 | −7.0960E−02 | 4.3414E−02 | −1.8460E−02 | 5.4230E−03 | −1.0400E−03 | 1.1400E−04 | −5.5000E−06 |
| S13 | −5.6809E−02 | 3.3802E−02 | −1.0250E−02 | 4.0030E−03 | −1.5000E−03 | 3.5800E−04 | −4.9000E−05 | 3.5400E−06 | −1.1000E−07 |
| S14 | −4.2986E−02 | 2.1429E−02 | −7.4900E−03 | 1.8710E−03 | −3.6000E−04 | 5.0400E−05 | −4.8000E−06 | 2.8200E−07 | −7.5000E−09 |

Figure 37:
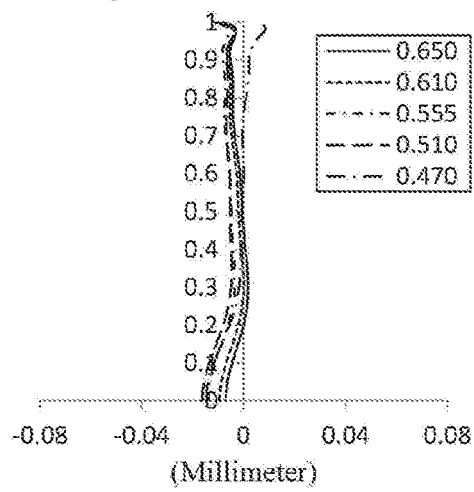
FIGS. 37 to 40 show a longitudinal aberration curve, an astigmatism curve, a distortion curve and a lateral color curve of the optical imaging lens assembly of Example 8, respectively.
Figure 38:
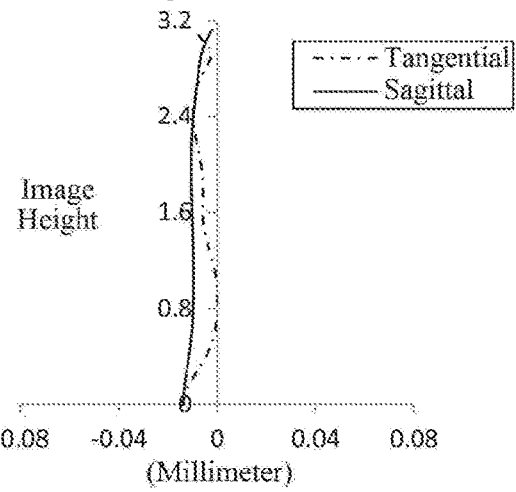
Figure 39:
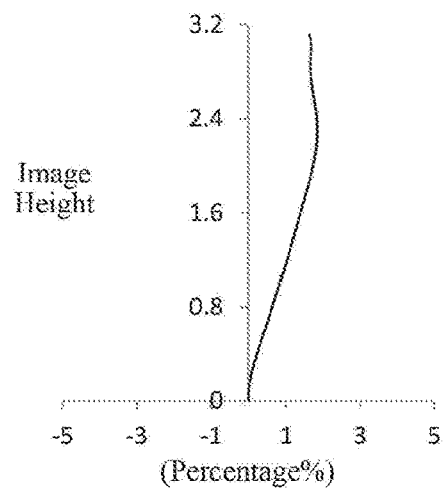
Figure 40:
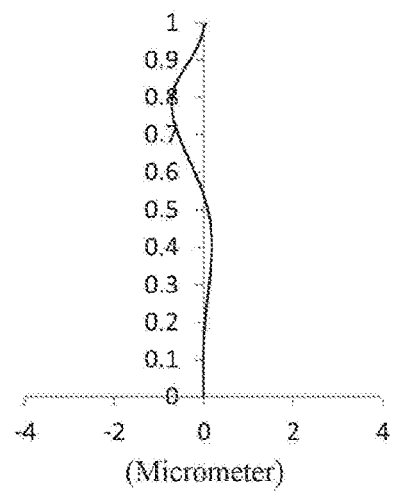

FIG. 37 illustrates a longitudinal aberration curve of the optical imaging system according to Example 8, representing deviations of focal points converged by light of different wavelengths after passing through the optical imaging system. FIG. 38 illustrates an astigmatism curve of the optical imaging system according to Example 8, representing a curvature of a tangential plane and a curvature of a sagittal plane. FIG. 39 illustrates a distortion curve of the optical imaging system according to Example 8, representing amounts of distortion corresponding to different FOVs. FIG. 40 illustrates a lateral color curve of the optical imaging system according to Example 8, representing deviations of different image heights on an image plane after light passes through the optical imaging system. It can be seen from FIG. 37 to FIG. 40 that the optical imaging system provided in Example 8 is suitable for portable electronic products and has a large aperture and good imaging quality.

Example 9

An optical imaging lens assembly according to Example 9 of the disclosure is described below with reference to FIGS. 41 to 45.

Figure 41:
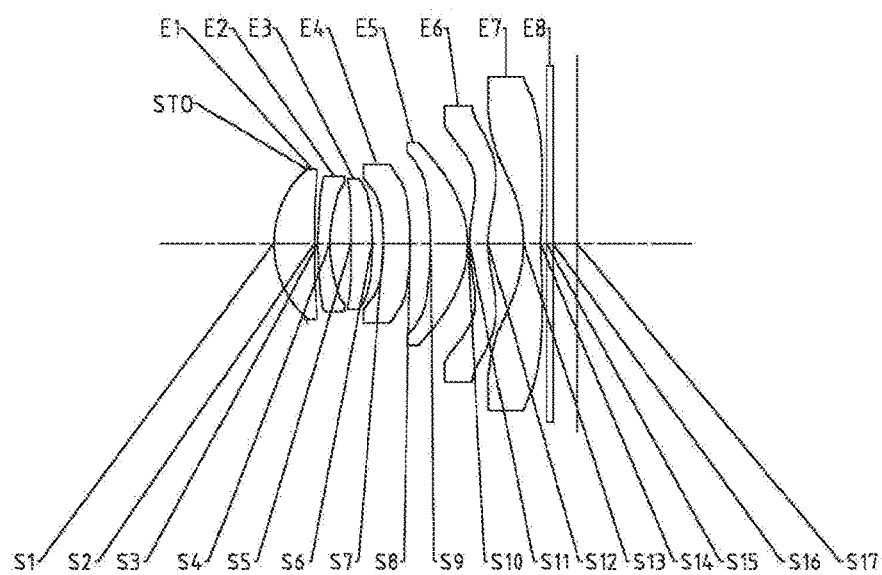
FIG. 41 shows a schematic structural diagram of an optical imaging lens assembly of Example 9.

FIG. 41 is a schematic structural diagram illustrating the optical imaging lens assembly of Example 9. The optical imaging lens assembly sequentially includes a first lens E1, a second lens E2, a third lens E3, a fourth lens E4, a fifth lens E5, a sixth lens E6, and a seventh lens E7 from an object side to an image side.

The first lens E1 may have a positive refractive power. An object side surface S1 of the first lens E1 may be convex and the image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be convex.

The fifth lens E5 may have a positive refractive power. An object side surface S9 of the fifth lens E5 may be concave, and an image side surface S10 of the fifth lens E5 may be convex.

The sixth lens E6 may have a negative refractive power. An object side surface S11 of the sixth lens E6 may be convex, and an image side surface S12 of the sixth lens E6 may be concave.

The seventh lens E7 may have a negative refractive power. An object side surface S13 of the seventh lens E7 may be concave, and an image side surface S14 of the seventh lens E7 may be concave.

Table 25 below shows effective focal lengths f1 to f7 of the first lens E1 to the seventh lens E7, a total effective focal length f of the optical imaging lens assembly, a total length TTL of the optical imaging lens assembly, and half of a diagonal length ImgH of the effective pixel region on the electronic photosensitive element.

TABLE 25

| f1 (mm) | 3.35 | f (mm) | 3.89 |
|---|---|---|---|
| f2 (mm) | −6.48 | TTL (mm) | 5.06 |
| f3 (mm) | 13.37 | ImgH (mm) | 3.12 |
| f4 (mm) | −26.42 | | |
| f5 (mm) | 3.73 | | |
| f6 (mm) | −24.31 | | |
| f7 (mm) | −2.99 | | |

Table 26 below shows the surface type, curvature radius, thickness, material, and conic coefficient of each of the lenses in the optical imaging lens assembly of this example, wherein both the curvature radius and the thickness are expressed in millimeters (mm).

TABLE 26

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5537 | | | |
| S1 | Aspherical | 1.7320 | 0.6800 | 1.55 | 56.1 | 0.1442 |
| S2 | Aspherical | 28.2159 | 0.0599 | | | 99.0000 |
| S3 | Aspherical | 4.9915 | 0.2008 | 1.65 | 23.5 | 5.9161 |
| S4 | Aspherical | 2.2365 | 0.3532 | | | 1.1557 |
| S5 | Aspherical | 17.1106 | 0.3527 | 1.55 | 56.1 | −16.8624 |
| S6 | Aspherical | −12.6381 | 0.1869 | | | −69.8681 |
| S7 | Aspherical | −5.4989 | 0.4471 | 1.65 | 23.5 | 22.5229 |
| S8 | Aspherical | −8.3859 | 0.3426 | | | 30.3891 |
| S9 | Aspherical | −5.0794 | 0.6233 | 1.55 | 56.1 | −43.4151 |
| S10 | Aspherical | −1.5169 | 0.0250 | | | −1.0145 |
| S11 | Aspherical | 2.3072 | 0.3074 | 1.65 | 23.5 | −11.4542 |

TABLE 26-continued

| Surface No. | Surface Type | Curvature Radius | Thickness | Material | | Conic Coefficient |
| | | | | Refractive Index | Abbe Number | |
| --- | --- | --- | --- | --- | --- | --- |
| S12 | Aspherical | 1.9058 | 0.5854 | | | −7.4272 |
| S13 | Aspherical | −2.4187 | 0.2800 | 1.55 | 56.1 | −3.2277 |
| S14 | Aspherical | 5.2410 | 0.1014 | | | −35.5615 |
| S15 | Spherical | Infinite | 0.1100 | 1.52 | 64.2 | |
| S16 | Spherical | Infinite | 0.4042 | | | |
| S17 | Spherical | Infinite | | | | |

Table 27 below shows the coefficients of the higher order terms of each of the aspherical surfaces S1-S14 that can be used for each of the aspherical lenses in this example, wherein each aspherical surface type may be defined by formula (1) given in Example 1 above.

TABLE 27

| Surface No. | A4 | A6 | A8 | A10 | A12 | A14 | A16 | A18 | A20 |
| --- | --- | --- | --- | --- | --- | --- | --- | --- | --- |
| S1 | 1.3840E−03 | 1.1655E−02 | −2.6360E−02 | 4.3515E−02 | −3.8050E−02 | 1.8005E−02 | −3.6500E−03 | 0.0000E+00 | 0.0000E+00 |
| S2 | −5.0260E−02 | 2.1747E−01 | −4.0475E−01 | 4.7060E−01 | −3.3896E−01 | 1.3681E−01 | −2.3540E−02 | 0.0000E+00 | 0.0000E+00 |
| S3 | −1.7586E−01 | 4.1278E−01 | −7.0349E−01 | 8.3569E−01 | −6.3817E−01 | 2.8422E−01 | −5.5440E−02 | 0.0000E+00 | 0.0000E+00 |
| S4 | −1.4650E−01 | 2.1830E−01 | −1.8432E−01 | −9.7880E−02 | 5.0701E−01 | −5.2052E−01 | 2.0102E−01 | 0.0000E+00 | 0.0000E+00 |
| S5 | −7.8374E−02 | 1.5079E−02 | −4.9260E−02 | −3.0355E−01 | 1.6618E+00 | −3.6514E+00 | 4.2834E+00 | −2.6069E+00 | 6.5226E−01 |
| S6 | −8.6009E−02 | −1.5797E−01 | 6.0777E−01 | −2.1024E+00 | 4.6414E+00 | −6.4016E+00 | 5.4247E+00 | −2.5835E+00 | 5.2674E−01 |
| S7 | −8.9624E−02 | −7.8173E−02 | 8.4972E−02 | −3.7329E−01 | 1.1557E+00 | −2.0533E+00 | 2.2222E+00 | −1.3383E+00 | 3.3976E−01 |
| S8 | −3.4364E−02 | −6.9564E−02 | 1.1048E−01 | −2.5724E−01 | 4.1301E−01 | −3.9664E−01 | 2.2911E−01 | −7.5040E−02 | 1.0893E−02 |
| S9 | 2.6075E−02 | −5.3063E−02 | 2.2603E−02 | −1.1130E−02 | −1.8130E−02 | 3.2003E−02 | −1.8390E−02 | 4.5350E−03 | −4.0000E−04 |
| S10 | 5.1063E−02 | −2.6325E−02 | −1.3470E−02 | 5.7869E−02 | −8.1580E−02 | 5.8737E−02 | −2.2440E−02 | 4.3580E−03 | −3.4000E−04 |
| S11 | −4.4090E−02 | −4.4537E−02 | 4.9937E−02 | −4.6360E−02 | 2.6107E−02 | −8.4500E−03 | 1.5950E−03 | −1.6000E−04 | 7.0500E−06 |
| S12 | −6.8473E−02 | 1.1526E−02 | −7.9800E−03 | 2.6920E−03 | 1.3200E−04 | −2.4000E−04 | 4.8900E−05 | −3.6000E−06 | 6.1700E−08 |
| S13 | −6.3481E−02 | 3.0023E−02 | 4.7170E−03 | −6.3000E−03 | 1.9820E−03 | −3.2000E−04 | 2.8600E−05 | −1.3000E−06 | 1.7500E−08 |
| S14 | −6.4758E−02 | 3.5992E−02 | −1.5330E−02 | 5.5000E−03 | −1.4900E−03 | 2.6900E−04 | −3.0000E−05 | 1.8700E−06 | −5.0000E−08 |

Figure 42:
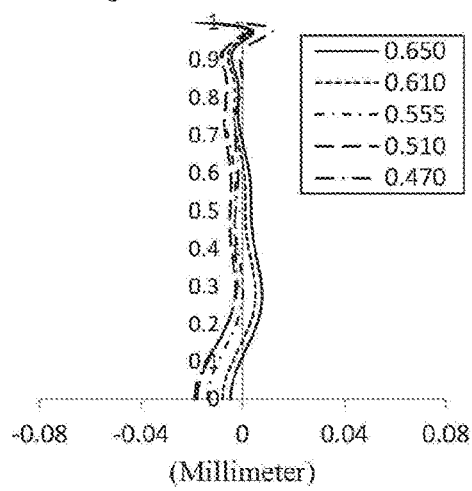
FIGS. 42 to 45 show a longitudinal aberration curve, an astigmatism curve, a distortion curve and a lateral color curve of the optical imaging lens assembly of Example 9, respectively.
Figure 43:
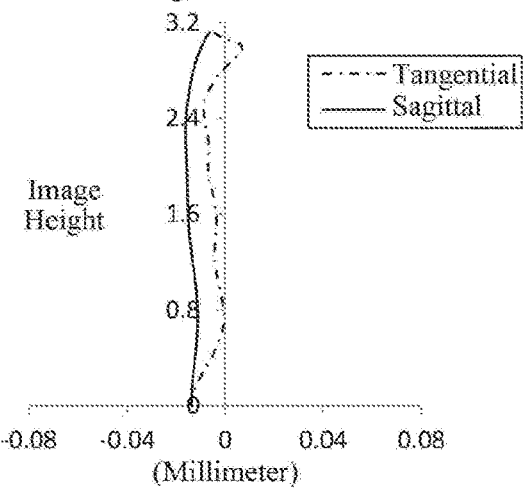
Figure 44:
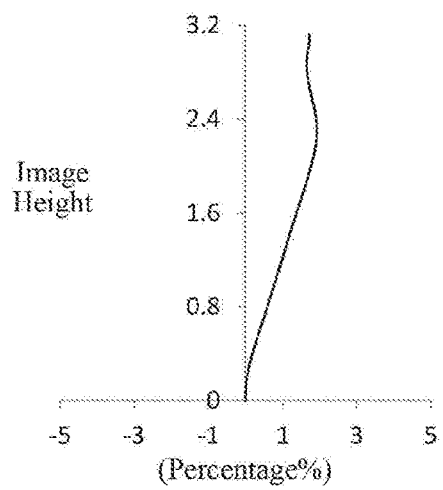
Figure 45:
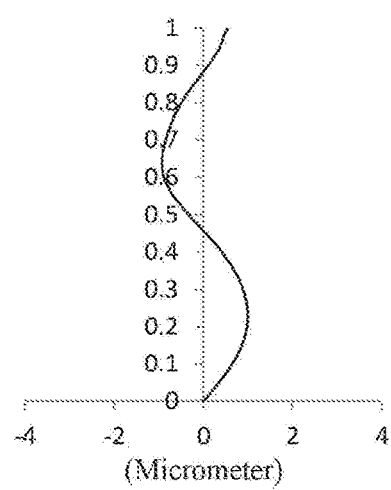

FIG. 42 illustrates a longitudinal aberration curve of the optical imaging system according to Example 9, representing deviations of focal points converged by light of different wavelengths after passing through the optical imaging system. FIG. 43 illustrates an astigmatism curve of the optical imaging system according to Example 9, representing a curvature of a tangential plane and a curvature of a sagittal plane. FIG. 44 illustrates a distortion curve of the optical imaging system according to Example 9, representing amounts of distortion corresponding to different FOVs. FIG. 45 illustrates a lateral color curve of the optical imaging system according to Example 9, representing deviations of different image heights on an image plane after light passes through the optical imaging system. It can be seen from FIG. 42 to FIG. 45 that the optical imaging system provided in Example 9 is suitable for portable electronic products and has a large aperture and good imaging quality.

In summary, in Examples 1 to 9 described above, each conditional expression satisfies the conditions listed in Table 28 below.

TABLE 28

| Conditional/ Example | 1 | 2 | 3 | 4 | 5 | 6 | 7 | 8 | 9 |
| --- | --- | --- | --- | --- | --- | --- | --- | --- | --- |
| f/EPD | 1.73 | 1.70 | 1.75 | 1.78 | 1.80 | 1.66 | 1.65 | 1.60 | 1.57 |
| f/T67 | 8.98 | 10.59 | 11.30 | 9.68 | 8.89 | 10.04 | 7.72 | 8.87 | 6.65 |
| f12/CT4 | 9.72 | 11.43 | 14.61 | 15.90 | 9.87 | 15.25 | 11.15 | 15.31 | 12.50 |
| TTL/ImgH | 1.67 | 1.68 | 1.69 | 1.59 | 1.66 | 1.64 | 1.64 | 1.66 | 1.62 |
| f5/f | 0.71 | 0.77 | 0.92 | 1.11 | 0.77 | 0.99 | 0.92 | 0.78 | 0.96 |
| f5/f7 | −1.02 | −1.19 | −1.54 | −1.78 | −1.04 | −1.60 | −1.36 | −1.28 | −1.25 |
| f1/CT1 | 6.36 | 6.18 | 5.19 | 5.68 | 5.43 | 5.11 | 4.84 | 4.69 | 4.93 |
| f56/CT2 | 13.20 | 13.08 | 16.11 | 17.29 | 18.60 | 17.07 | 19.70 | 17.72 | 20.55 |
| R6/R7 | 3.09 | 1.79 | 2.18 | 2.10 | 2.24 | 2.14 | 1.85 | 2.22 | 2.30 |
| R3/R10 | −4.42 | −3.05 | −2.74 | −2.31 | −3.00 | −2.33 | −3.35 | −3.49 | −3.29 |
| CT3/CT4 | 0.64 | 0.74 | 0.88 | 0.92 | 0.58 | 0.90 | 0.64 | 0.86 | 0.79 |
| T34/T23 | 0.28 | 0.37 | 0.62 | 0.61 | 0.33 | 0.57 | 0.42 | 0.48 | 0.53 |
| f12/f56 | 1.53 | 1.49 | 1.66 | 1.57 | 1.09 | 1.59 | 1.18 | 1.49 | 1.35 |

What is claimed is:

1. An optical imaging lens assembly, sequentially from an object side to an image side of the optical imaging lens assembly, comprising:
   a first lens with a positive refractive power and a concave image side surface;
   a second lens with a negative refractive power and a convex object side surface;
   a third lens with a refractive power and a convex image side surface;
   a fourth lens with a negative refractive power and a concave object side surface;
   a fifth lens with a positive refractive power and a convex image side surface;
   a sixth lens with a refractive power; and
   a seventh lens with a negative refractive power,
   wherein an effective focal length f of the optical imaging lens assembly and an entrance pupil diameter EPD of the optical imaging lens assembly satisfy f/EPD 1.80, and the effective focal length f of the optical imaging lens assembly and a space interval T67 between the sixth lens and the seventh lens satisfy 5.5<f/T67<11.5; and
   wherein the effective focal length f of the optical imaging lens assembly and an effective focal length f5 of the fifth lens satisfy 0.5<f5/f<1.5.

2. The optical imaging lens assembly according to claim 1, wherein a distance TTL along an optical axis from an object side surface of the first lens to an imaging surface and half of a diagonal length ImgH of an effective pixel region on the imaging surface satisfy TTL/ImgH≤1.70.

3. The optical imaging lens assembly according to claim 1, wherein an effective focal length f5 of the fifth lens and an effective focal length f7 of the seventh lens satisfy −2<f5/f7<−1.

4. The optical imaging lens assembly according to claim 1, wherein an effective focal length f1 of the first lens and a central thickness CT1 of the first lens satisfy 4.5<f1/CT1<6.5.

5. The optical imaging lens assembly according to claim 1, wherein a combined focal length f56 of the fifth lens and the sixth lens and a central thickness CT2 of the second lens satisfy 13.0<f56/CT2<21.0.

6. The optical imaging lens assembly according to claim 1, wherein a curvature radius R6 of the image side surface of the third lens and a curvature radius R7 of the object side surface of the fourth lens satisfy 1.5<R6/R7<3.5.

7. The optical imaging lens assembly according to claim 1, wherein a curvature radius R3 of the object side surface of the second lens and a curvature radius R10 of the image side surface of the fifth lens satisfy −5.0<R3/R10<−2.0.

8. The optical imaging lens assembly according to claim 1, wherein a central thickness CT3 of the third lens and a central thickness CT4 of the fourth lens satisfy 0.5<CT3/CT4<1.0.

9. The optical imaging lens assembly according to claim 1, wherein a space interval T23 between the second lens and the third lens and a space interval T34 between the third lens and the fourth lens satisfy T34/T23<1.0.

10. The optical imaging lens assembly according to claim 1, wherein a combined focal length f12 of the first lens and the second lens and a combined focal length f56 of the fifth lens and the sixth lens satisfy 1.0<f12/f56<2.0.

11. An optical imaging lens assembly, sequentially from an object side to an image side of the optical imaging lens assembly, comprising:
    a first lens with a positive refractive power and a concave image side surface;
    a second lens with a negative refractive power and a convex object side surface;
    a third lens with a refractive power and a convex image side surface;
    a fourth lens with a negative refractive power and a concave object side surface;
    a fifth lens with a positive refractive power and a convex image side surface;
    a sixth lens with a refractive power; and
    a seventh lens with a negative refractive power,
    wherein a combined focal length f12 of the first lens and the second lens and a central thickness CT4 of the fourth lens satisfy 9.0<f12/CT4<16.0.

12. The optical imaging lens assembly according to claim 11, wherein a distance TTL along an optical axis from an object side surface of the first lens to an imaging surface and half of a diagonal length ImgH of an effective pixel region on the imaging surface satisfy TTL/ImgH≤1.70.

13. The optical imaging lens assembly according to claim 11, wherein an effective focal length f of the optical imaging lens assembly and an effective focal length f5 of the fifth lens satisfy 0.5<f5/f<1.5.

14. The optical imaging lens assembly according to claim 11, wherein an effective focal length f5 of the fifth lens and an effective focal length f7 of the seventh lens satisfy −2<f5/f7<−1.

15. The optical imaging lens assembly according to claim 14, wherein an effective focal length f1 of the first lens and a central thickness CT1 of the first lens satisfy 4.5<f1/CT1<6.5.

16. The optical imaging lens assembly according to claim 14, wherein a combined focal length f56 of the fifth lens and the sixth lens and a central thickness CT2 of the second lens satisfy 13.0<f56/CT2<21.0.

17. The optical imaging lens assembly according to claim 11, wherein a central thickness CT3 of the third lens and a central thickness CT4 of the fourth lens satisfy 0.5<CT3/CT4<1.0.

18. The optical imaging lens assembly according to claim 11, wherein a space interval T23 between the second lens and the third lens and a space interval T34 between the third lens and the fourth lens satisfy T34/T23<1.0.

19. The optical imaging lens assembly according to claim 11, wherein a combined focal length f12 of the first lens and the second lens and a combined focal length f56 of the fifth lens and the sixth lens satisfy 1.0<f12/f56<2.0.

* * * * *